US012758050B2

(12) United States Patent
Beaumont et al.

(10) Patent No.: US 12,758,050 B2
(45) **Date of Patent: *Oct. 13, 2026**

(54) SYSTEM AND METHOD FOR GREASE CONTAINMENT FOR AN OUTDOOR COOKING DEVICE

(71) Applicant: The Grease Box LLC, Phoenix, AZ (US)

(72) Inventors: Amy Beaumont, Tempe, AZ (US); Markus Dale Hillman, Mesa, AZ (US)

(73) Assignee: The Grease Box LLC, Phoenix, AZ (US)

( * ) Notice: Subject to any disclaimer, the term of this patent is extended or adjusted under 35 U.S.C. 154(b) by 581 days.

This patent is subject to a terminal disclaimer.

(21) Appl. No.: 18/377,169

(22) Filed: Oct. 5, 2023

(65) Prior Publication Data

US 2024/0023757 A1 Jan. 25, 2024

Related U.S. Application Data

(63) Continuation-in-part of application No. 16/984,646, filed on Aug. 4, 2020, now Pat. No. 11,812,895.

(51) Int. Cl.
*A47J 37/07* (2006.01)
*F24C 15/14* (2006.01)

(52) U.S. Cl.
CPC ....... *A47J 37/0786* (2013.01); *A47J 37/0704* (2013.01); *F24C 15/14* (2013.01)

(58) Field of Classification Search
CPC .... A47J 37/0786; A47J 37/0704; F24C 15/14
See application file for complete search history.

(56) References Cited

U.S. PATENT DOCUMENTS 4,434,781 A 3/1984 Koziol
4,909,137 A 3/1990 Brugnoli
(Continued)

FOREIGN PATENT DOCUMENTS

CN 202960181 U 6/2013
CN 106913230 A 7/2017
(Continued)

OTHER PUBLICATIONS

Image (1), retrieved Jun. 2025, https://www.amazon.com/Traeger-Grills-BAC608-EZ-Clean-Aluminum/dp/B0BZ9RHHPP?th=1, Traegar Timberline, at least as early as Nov. 11, 2024 (pp. 1-1).
(Continued)

*Primary Examiner* — Justin C Dodson
*Assistant Examiner* — Keith Brian Assante
(74) *Attorney, Agent, or Firm* — PIERSON FERDINAND LLP; Keats Quinalty

(57) ABSTRACT

A system, relating to catching fluid drainage from an outdoor cooking device in an outdoor environment, comprising at least one receptacle structured and arranged to receive and collect fluid draining from the outdoor cooking device and an enclosure structured and arranged to enclose the at least one receptacle. The enclosure comprises an upper portion comprising a top and side walls, and a lower portion comprising a bottom and side walls surrounding the at least one receptacle, the lower portion being separable from the upper portion. The enclosure may further comprise an internal mount configured to mount the enclosure to the outdoor cooking device. In some embodiments, the system may further comprise one or more hinges coupling the enclosure to the outdoor cooking device or one or more notched mounting brackets.

20 Claims, 30 Drawing Sheets

(56) References Cited

U.S. PATENT DOCUMENTS

| | | | | |
|---|---|---|---|---|
| 5,582,094 | A | 12/1996 | Peterson | |
| 6,182,560 | B1 | 2/2001 | Andress | |
| 6,237,472 | B1 | 5/2001 | Gates | |
| 6,247,468 | B1 | 6/2001 | Wood | |
| 6,463,924 | B1 | 10/2002 | Osterman | |
| 8,016,150 | B1 * | 9/2011 | Bunch | A47J 37/1271 220/571 |
| 2008/0271613 | A1 | 11/2008 | Lee | |
| 2013/0313256 | A1 | 11/2013 | Brown | |
| 2014/0311356 | A1 | 10/2014 | Daniels | |
| 2017/0020336 | A1 | 1/2017 | Cole | |
| 2017/0119209 | A1 | 5/2017 | Jenks | |
| 2017/0196400 | A1 * | 7/2017 | Colston | A23L 5/10 |
| 2018/0168395 | A1 | 6/2018 | Colston | |
| 2018/0228317 | A1 | 8/2018 | Hunt | |
| 2018/0296031 | A1 | 10/2018 | Terrell, Jr. | |
| 2018/0338641 | A1 | 11/2018 | Yaghotian | |
| 2019/0365151 | A1 | 12/2019 | Dahle | |

FOREIGN PATENT DOCUMENTS

| | | | |
|---|---|---|---|
| CN | 108478035 | A | 9/2018 |
| CN | 210493798 | U | 5/2020 |
| GB | 2086713 | | 5/1982 |
| KR | 20140000548 | U | 1/2014 |
| KR | 101803028 | B1 | 11/2017 |

OTHER PUBLICATIONS

Images (2) retrieved Jun. 2025, https://www.acehardware.com/departments/outdoor-living/grills-and-smokers/pellet-grills/F016490?variationProductCode=8024035, Traeger Timberline 850, exterior view, at least as early as Nov. 11, 2024 (pp. 1-2).

Images (2) retrieved Jun. 2025, https://www.acehardware.com/departments/outdoor-living/traeger/traeger-grills?gad_ source= 1 &gad_cam paignid=20446483560&gbraid=0AAAAADtqLJGOb4-1 i Uc Ki H BG8tPoKOgcN &gclid=Cj0KCQj wm K_ CBhCEARIsAM KwcO6TI4SKQ-F 1 rli I-FxPZBQo4xq0Vn9VS95FDI7X-oNsCw0dY cqH7 -MaAIOUEALw_wcB&gclsrc=aw.ds, Traeger Timberline 1300 and 1300XL, at least as early as Nov. 11, 2024 (pp. 1-2).

Images (2) retrieved Jun. 2025, https://www.traeger.com/timberline?_gl=1*1wg8k70*_up*MQ .. *_gs*MQ ..&gclid=Cj0KCQjwmK_CBhCEARIsAMKwcD4RmGDZM7XwcAZEa-TsISQ7A3bZLfxG21WXsxzGD0rmeQDoA29nAa4aAt5IEALw_wcB&gbraid=0AAAAAD_SnFY2GlyhYkiNOtC2S2nSnKyWd , Traeger Timberline Series (with undermount trap), at least as early as Nov. 11, 2024 (pp. 1-2).

Images (2), retrieved Jun. 2025, https://www.acehardware.com/departments/outdoor-living/traeger/traeger-grills?gad_ source= 1 &gad_cam paignid=20446483560&gbraid=0AAAAADtqLJGOb4-1 i Uc Ki H BG8tPoKOgcN &gclid=Cj0KCQj wm K_ CBhCEARIsAM KwcO6TI4SKQ-F 1r li I-FxPZBQo4xq0Vn9VS95FDI7X-oNsCwOdY cqH7 -MaAIOUEALw_wcB&gclsrc=aw.ds, Traeger I ronwood1300 and 1300XL, at least as early as Nov. 11, 2024 (pp. 1-2).

Photograph (1) obtained by Applicant, Traeger Flatrock Series Propane Grill/Griddle, at least as early as Nov. 11, 2024. Image, retrieved Jun. 2025, https://www.acehardware.com/departments/outdoor-living/traeger/traeger-grills?gad_ source= 1 &gad_ cam paignid=20446483560&gbraid=0AAAAADtqLJGOb4-1 i Uc Ki H BG8tPoKOgcN &gclid=Cj0KCQj wm K_ CBhCEARIsAM Kwc06TI4SKQ-F 1 rli I-FxPZBQo4xq0Vn9VS95FDI7X-oNsCwOdY cqH7 -MaAIOUEALw wcB&gclsrc=aw.ds, Traeger Flatrock propane grill, at least as early as Nov. 11, 2024 (pp. 1-1).

Photographs (3) obtained by Applicant, Traeger Timberline 850/1300, at least as early as Nov. 11, 2024. Image retrieved Jun. 2025, https://www.acehardware.com/departments/outdoor-living/traeger/traeger-grills?gad_ source= 1 &gad_ cam paignid=20446483560&gbraid=0AAAAADtqLJGOb4-1 i Uc Ki H BG8tPoKOgcN &gclid=Cj0KCQj wm K_ CBhCEARIsAM KwcO6TI4SKQ-F 1 rli I-FxPZBQo4xq0Vn9VS95FDI7X-oNsCwOdY cqH7 -MaAIOUEALw_wcB&gclsrc=aw.ds, Traeger Timberline 850/1300 exterior view, at least as early as Nov. 11, 2024.

Photographs (5) obtained by Applicant, Traeger Ironwood, at least as early as Nov. 11, 2024 (pp. 1-5).

Photographs (6) obtained by Applicant, Traeger Flatrock, at least as early as Nov. 11, 2024 (pp. 1-6).

* cited by examiner

SECTION B-B

SYSTEM AND METHOD FOR GREASE CONTAINMENT FOR AN OUTDOOR COOKING DEVICE

CROSS REFERENCE TO RELATED APPLICATIONS

This application is a continuation in part of U.S. application Ser. No. 16/984,646 entitled "Grease Containment Systems" to Amy Beaumont et al., filed on Aug. 4, 2020.

BACKGROUND

1. Field of the Invention

Generally, this invention relates to fluid and grease collection systems for use with an outdoor cooking device.

2. Description of Related Art

This invention relates to providing a system for improved grease containment systems. More particularly this invention relates to providing a system for increased safety in grease containment in outdoor cooking devices, such as smokers, grills, etc. Outdoor cooking devices collect juices and/or ash from the food as it is being cooked and then drain the juices and/or ash into a bucket through a drain.

The bucket is open at the top and can easily be spilled if bumped by people, objects (like toys, balls, etc.) or a stream of water from a garden hose. Additionally, with an open top, water from rain, sprinklers, and garden hoses can mix with the grease and overflow or tip the bucket spilling the fluids, which are mostly grease. When the grease is spilled, it creates a mess. The grease may coat a surface in such a way as to create a slipping hazard and is difficult to clean up. Further, the grease attracts insects and other animals and over time can lead to undesirable smells in the area around the outdoor cooking device.

Likewise, the bucket and its contents, which are often hot, can be directly touched by people around the cooking device. Burns, particularly for children and pets, can be severe and are highly undesirable. Additionally, when the outdoor cooking device is used at higher temperatures, there is a risk of hot air exiting the drain and catching the grease on fire in the bucket.

SUMMARY

The present invention provides among other things, a system, relating to catching fluid drainage from an outdoor cooking device in an outdoor environment, comprising: at least one receptacle structured and arranged to receive and collect fluid draining from the outdoor cooking device generated by food cooking within a cooking enclosure of the outdoor cooking device; an enclosure structured and arranged to enclose such at least one receptacle; wherein such enclosure comprises at least one receptacle support structured and arranged to support such at least one receptacle, at least one mount structured and arranged to mount such enclosure on the outdoor cooking device, walls surrounding such at least one receptacle, a top and a bottom; wherein such enclosure comprises at least one insulation layer between such receptacle and such walls; wherein such enclosure is directly exposed to the outdoor environment while mounted on the outdoor cooking device.

Moreover, it provides such a system further comprising the outdoor cooking device. Additionally, it provides such a system wherein such outdoor cooking device comprises a wood pellet grill. Also, it provides such a system wherein such outdoor cooking device comprises a fluid drainage outlet in a side of such outdoor cooking device. In addition, it provides such a system wherein such outdoor cooking device comprises a fluid drainage outlet in a bottom of such outdoor cooking device. And, it provides such a system wherein such enclosure further comprises an upper portion and a lower portion; wherein such upper portion comprises such top, such lower portion comprises such bottom and both such upper portion and such lower portion comprise such walls.

Further, it provides such a system wherein at least one wall of such walls comprises at least one thermal vent structured and arranged to vent heat from the fluid collected in such at least one receptacle out of such enclosure. Even further, it provides such a system wherein such lower portion separates from such upper portion. Additionally, it provides such a system wherein such lower portion and such upper portion comprise interlocking rails structured and arranged to enable such lower portion to slide with respect to such upper portion. Even further, it provides such a system wherein such lower portion comprises at least one latching mechanism structured and arranged to latch together such upper portion and such lower portion and stopping relative motion between such upper portion and such lower portion.

Even further, it provides such a system wherein such upper portion comprises at least one fluid channel structured and arranged to redirect the fluid drainage from a fluid drainage outlet of the outdoor cooking equipment to such at least one receptacle. Moreover, it provides such a system wherein such upper portion comprises such at least one mount. Even further, it provides such a system wherein such lower portion comprises such at least one insulation layer. Even further, it provides such a system wherein such lower portion comprises such at least one receptacle support. Even further, it provides such a system wherein such lower portion comprises at least one handle.

Even further, it provides such a system wherein such lower portion comprises a watertight portion structured and arranged to collect fluid spills from such at least one receptacle. Additionally, it provides such a system wherein at least one wall of such walls comprises at least one thermal vent structured and arranged to vent heat from the fluid collected in such at least one receptacle out of such enclosure. Moreover, it provides such a system wherein such at least one thermal vent comprises at least one damper structured and arranged to dampen air flow through said enclosure. Even further, it provides such a system wherein such enclosure comprises a watertight portion structured and arranged to collect fluid spills from such at least one receptacle.

Additionally, it provides such a system wherein such at least one insulation layer comprises at least one air gap between such at least one receptacle and such walls. Even further, it provides such a system further comprising at least one fluid channel structured and arranged to redirect the fluid drainage from a fluid drainage outlet of the outdoor cooking equipment to such at least one receptacle. Moreover, it provides such a system wherein such at least one receptacle support comprises at least one wall protrusion structured and arranged to protrude from at least one wall of such walls and engage such at least one receptacle. Even further, it provides such a system wherein such top is solid.

In accordance with another preferred embodiment hereof, this invention provides a system, relating to catching fluid drainage from an outdoor cooking device in an outdoor environment, comprising: the outdoor cooking device; at least one receptacle structured and arranged to receive and collect fluid draining from such outdoor cooking device generated by food cooking within a cooking enclosure of such outdoor cooking device; an enclosure structured and arranged to enclose such at least one receptacle; wherein such enclosure comprises at least one receptacle support structured and arranged to support such at least one receptacle, at least one mount structured and arranged to mount such enclosure on such outdoor cooking device, walls surrounding such at least one receptacle, a top and a bottom; wherein such enclosure comprises at least one insulation layer between such receptacle and such walls; wherein at least one wall of such walls comprises at least one thermal vent structured and arranged to vent heat from the fluid collected in such at least one receptacle out of such enclosure; wherein such at least one thermal vent comprises at least one damper structured and arranged to dampen air flow through said enclosure; and wherein such enclosure is directly exposed to the outdoor environment while mounted on such outdoor cooking device.

Additionally, it provides such a system wherein such outdoor cooking device comprises a wood pellet grill. Even further, it provides such a system wherein such enclosure further comprises an upper portion and a lower portion; wherein such upper portion comprises such top, such lower portion comprises such bottom and both such upper portion and such lower portion comprise such walls. Even further, it provides such a system wherein at least one wall of such walls comprises at least one thermal vent structured and arranged to vent heat from the fluid collected in such at least one receptacle out of such enclosure. Even further, it provides such a system wherein such lower portion separates from such upper portion.

Even further, it provides such a system wherein such lower portion and such upper portion comprise interlocking rails structured and arranged to enable such lower portion to slide with respect to such upper portion. Even further, it provides such a system wherein such lower portion comprises at least one latching mechanism structured and arranged to latch together such upper portion and such lower portion and stopping relative motion between such upper portion and such lower portion. Moreover, it provides such a system wherein such upper portion comprises at least one fluid channel structured and arranged to redirect the fluid drainage from a fluid drainage outlet of the outdoor cooking equipment to such at least one receptacle.

In some implementations a system relating to catching fluid drainage from an outdoor cooking device in an outdoor environment may comprise at least one receptacle structured and arranged to receive and collect fluid draining from the outdoor cooking device generated by food cooking within a cooking enclosure of the outdoor cooking device. The system may further comprise an enclosure structured and arranged to enclose the at least one receptacle, wherein the enclosure may comprise an upper portion comprising a top and side walls and a lower portion comprising a bottom and side walls surrounding the at least one receptacle, the lower portion being separable from the upper portion. The system may further comprise at least one mount configured to mount the enclosure to the outdoor cooking device.

Particular aspects may include one or more of the following features. The system may further comprise the outdoor cooking device. The outdoor cooking device may comprise a wood pellet grill. The mount may be welded to the outdoor cooking device. The upper portion of the enclosure may be permanently affixed to the outdoor cooking device. The lower portion and the upper portion may comprise interlocking rails structured and arranged to enable said lower portion to slide with respect to said upper portion. The system may further comprise at least one hinge coupled to at least one of the upper portion and the lower portion of the enclosure and the outdoor cooking device.

The mount may comprise at least one fluid channel structured and arranged to redirect the fluid drainage from a fluid and/or ash drainage outlet of the outdoor cooking equipment to the at least one receptacle. The lower portion of the enclosure may comprise at least one handle. The lower portion may comprise a watertight portion structured and arranged to collect fluid spills from said at least one receptacle. The at least one mount may comprise at least one notched mounting bracket.

In some implementations, a system, relating to catching fluid drainage from an outdoor cooking device in an outdoor environment may comprise the outdoor cooking device, a receptacle structured and arranged to receive and collect fluid draining from the outdoor cooking device generated by food cooking within a cooking enclosure of the outdoor cooking device, and an enclosure configured to enclose the at least one receptacle, the enclosure comprising at least one mount internal to the enclosure, the mount further comprising a fluid channel configured to redirect fluid drainage from a fluid drainage outlet of the outdoor cooking device to the receptacle.

Particular aspects may include one or more of the following features. The enclosure may be permanently affixed to the outdoor cooking device. The system may further comprise at least one hinge coupled to the enclosure and the outdoor cooking device. The enclosure may comprise at least one handle on an exterior surface of the enclosure. The enclosure may comprise an upper portion and a lower portion that are removably coupled.

Implementations of a system, relating to catching fluid drainage from an outdoor cooking device in an outdoor environment may comprise a receptacle structured and arranged to receive and collect fluid draining from the outdoor cooking device generated by food cooking within a cooking enclosure of the outdoor cooking device and an enclosure structured and arranged to enclose said at least one receptacle, the enclosure comprising at least two external protrusions configured to affix the enclosure to the outdoor cooking device such that a fluid drainage outlet of the outdoor cooking device extends not the enclosure and directs fluid from the outdoor cooking device into the receptacle.

Particular aspects may include one or more of the following features. The system may further comprise the outdoor cooking device. The outdoor cooking device may be a wood pellet grill. The enclosure may further comprise at least one thermal vent.

In accordance with another preferred embodiment or an alternative embodiment hereof, this invention provides for each and every novel feature, element, combination, step and/or method disclosed or suggested by this patent application.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or Claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION, DRAWINGS, and CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
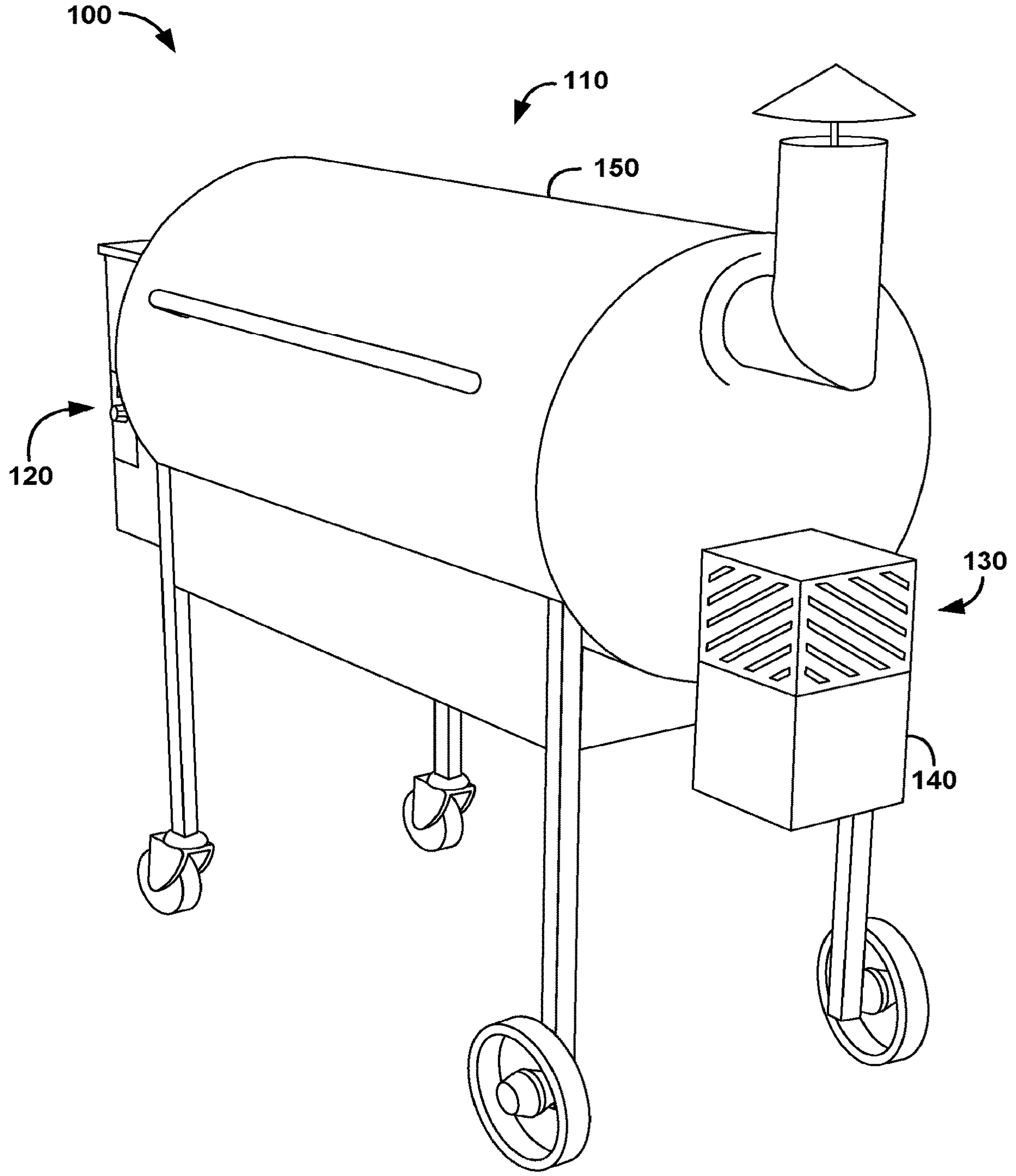
FIG. 1 shows a perspective view illustrating a fluid containment system according to a preferred embodiment of the present invention.

FIG. 1 shows a perspective view illustrating a fluid containment system 100 according to a preferred embodiment of the present invention. Fluid containment system 100 comprises an outdoor cooking device 110 and enclosure 140, as shown. Outdoor cooking device 110 preferably comprises a device to cook food, preferably a grill, preferably a wood pellet grill, as shown. Upon reading the teachings of this specification, those with ordinary skill in the art will now appreciate that, under appropriate circumstances, considering such issues as future technologies, cooking methods, etc., other outdoor cooking devices, such as, for example, grills, sun ovens, dehydrators, curing ovens, stoves, etc., may suffice.

Outdoor cooking device 110 preferably comprises a cooking enclosure 150, cooking controls 120 and at least one drain 130, as shown. In use, outdoor cooking device 110 cooks food located within cooking enclosure 150. Controls 120 set levels of cooking and control the cooking environment within the cooking enclosure 150.

As the food cooks, liquids drip from the food and collect in or near the bottom of cooking enclosure 150. In foods containing fats, the liquids primarily comprise grease. The liquids and/or ash or other cooking discharge are collected drain out of cooking enclosure 150 through drain 130. Drain 130 preferably couples with a bucket, not shown, which catches the liquids coming out drain 130. The bucket can therefore be emptied between uses to dispose of the liquids, such as grease, which do not evaporate into the outdoor environment.

Fluid containment system 100 additionally places enclosure 140 around the bucket, as shown (at least embodying herein an enclosure 25 structured and arranged to enclose said at least one receptacle)

Enclosure 140 provides a safety enhancement to the bucket. Enclosure 140 secures the bucket to drain 130, as shown, preventing direct contact with and upsetting the bucket, which can cause spilling of the liquids. Further, enclosure 140 creates a safety buffer, as shown, preventing direct access to hot surfaces of the bucket and the liquids therein, which minimizes chances of burns from accidental contact.

Figure 2:
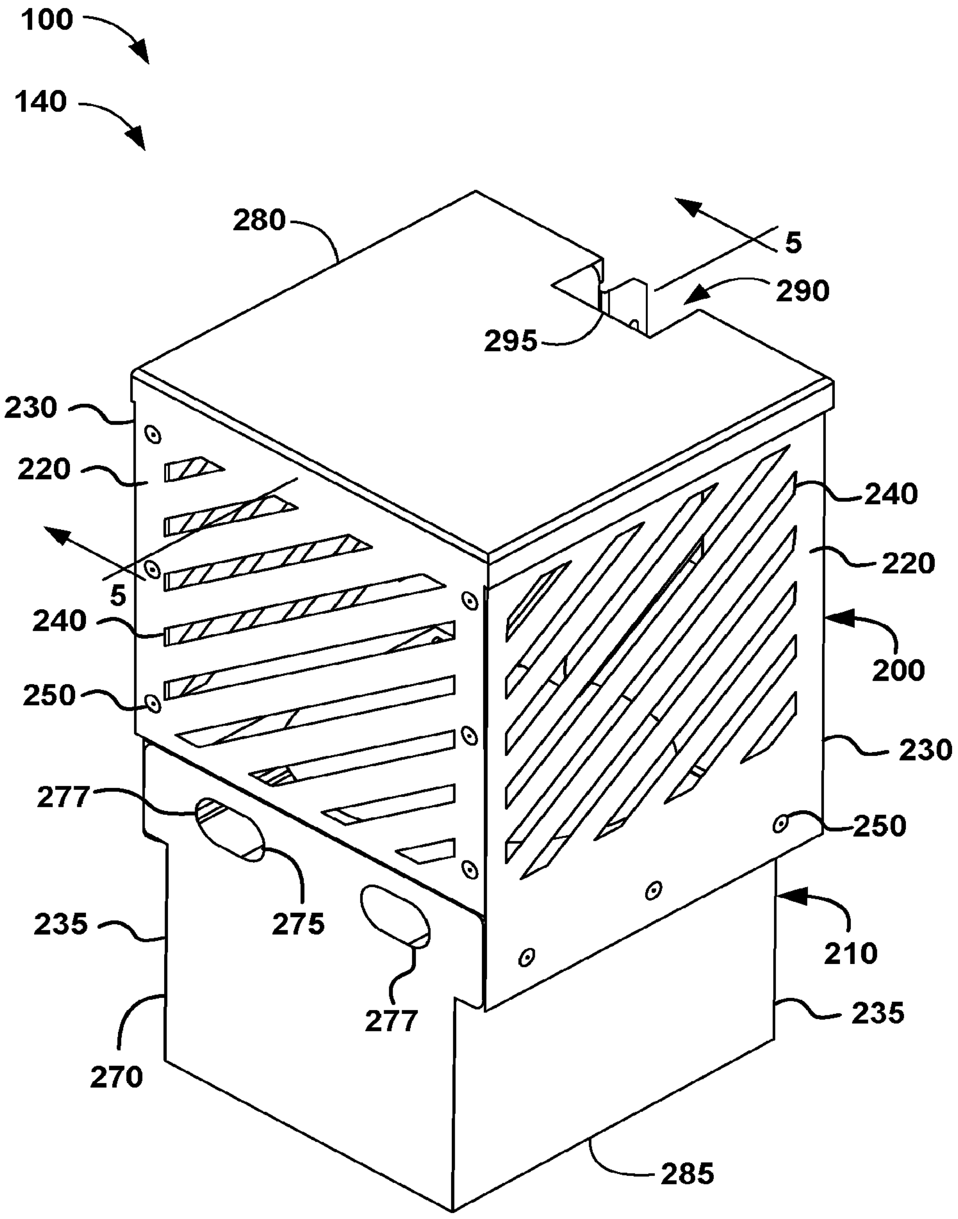
FIG. 2 shows a perspective view, illustrating an enclosure of the fluid containment system, according to the preferred embodiment of FIG. 1.
Figure 3:
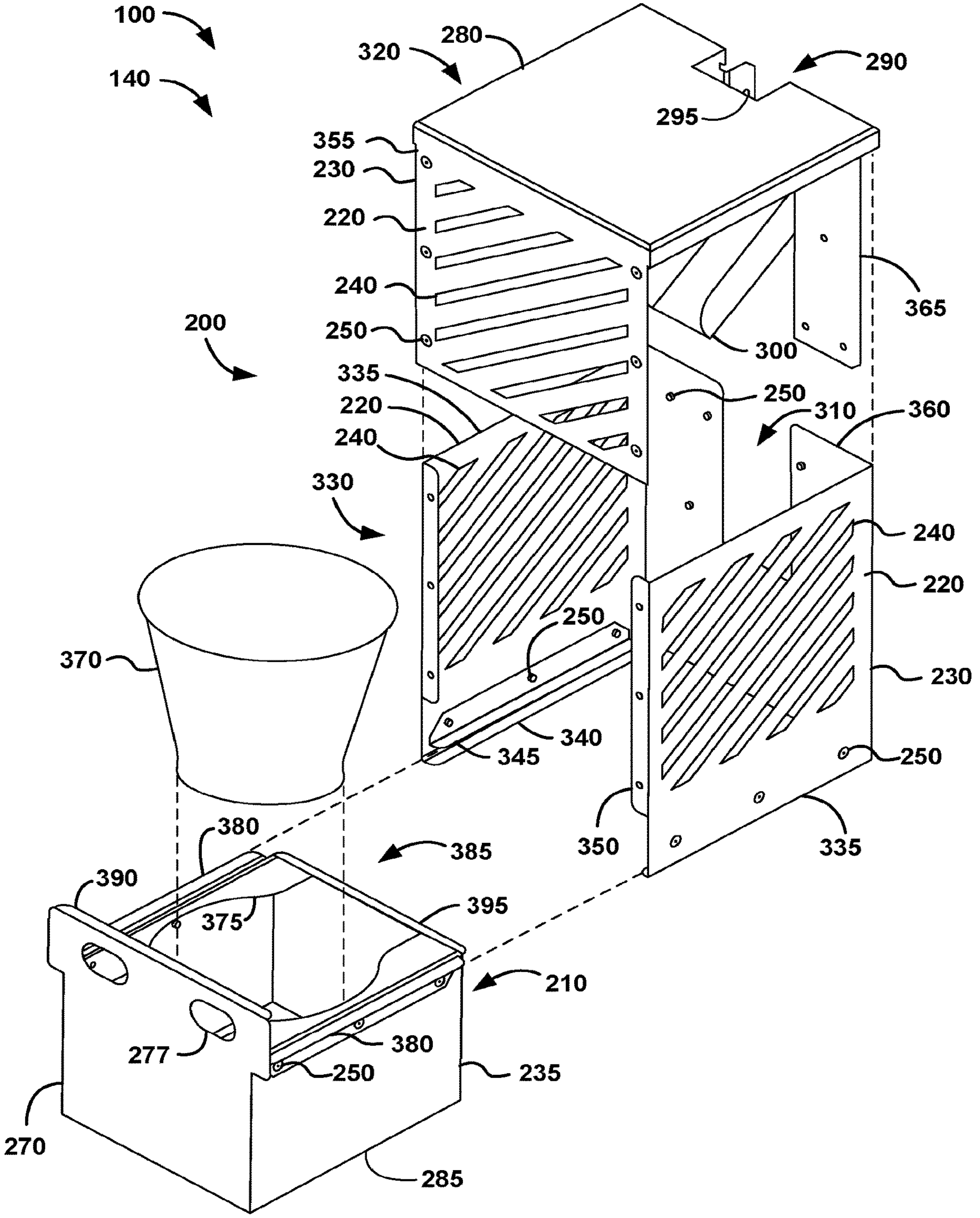
FIG. 3 shows an exploded view of the enclosure of the fluid containment system according to the preferred embodiment of FIG. 2.

FIG. 2 shows a perspective view, illustrating enclosure 140 of fluid containment system 100, according to the preferred embodiment of FIG. 1. Enclosure 140 preferably comprises an upper portion 200 and a lower portion 210, as shown. Upper portion 200 and lower portion 210 preferably separate, as best shown in FIG. 3, via a rail system. Upper portion 200 and lower portion 210 are each preferably assembled of constituent parts held together with fasteners 250, as shown. Upon reading the teachings of this specification, those with ordinary skill in the art will now appreciate that, under appropriate circumstances, considering such issues as future technologies, costs, consumer preferences, etc., other assembly means, such as, for example, casting, molding, 3-D printing, combinations thereof, etc., may suffice.

Fasteners 250 preferably comprise rivets, as shown, alternately preferably screws. Upon reading the teachings of this specification, those with ordinary skill in the art will now appreciate that, under appropriate circumstances, considering such issues as future technologies, manufacturing costs, durability, customer preferences, etc., other fasteners, such as, for example, bolts, adhesives, welds, slot joints, thumb screws, combinations of various fasteners, etc., may suffice.

Upper portion 200 preferably comprises a shell, as shown. The shell preferably comprises four walls 230 and a top 280, as shown. At least one wall 230 preferably comprises at least one ventilation panel 220, preferably at least two walls 230, preferably at least three walls 230, as shown. Ventilation panel 220 preferably allows air circulation through upper portion 200, as shown. The air circulation helps to cool the liquids in enclosure 140. Ventilation panel 220 preferably comprises at least one vent 240, preferably at least one opening in ventilation panel 220, preferably at least one slot opening, preferably at least one diagonal slot opening, as shown. Upon reading the teachings of this specification, those with ordinary skill in the art will now appreciate that, under appropriate circumstances, considering such issues as future technologies, manufacturing methods, costs, etc., other ventilation panels, such as, for example, circular openings, wavy opening, vertical openings, horizontal openings, splatter screens, perforations, angled perforations, etc., may suffice.

Upper portion 200 further comprises at least one drain receiver 290, as shown. Drain receiver 290 preferably comprises at least one opening, as shown. Opening comprises at least one top notch 295, as shown, and at least one back notch 310 (see FIG. 4). Drain receiver 290 preferably receives drain 130 of outdoor cooking device 110, as shown, allowing passage of the liquids into enclosure 140. Drain receiver 290 preferably is shaped and sized to at least receive drain 130, as shown, at a given angle, preferably at a plurality of angles, preferably a plurality of angles from horizontal to vertically downward. Top notch 295 preferably comprises a squared geometry, as shown, accommodating a drain geometry of drain 130 which is squared and extends at an angle such as to require passage, at least in part, through top 280.

Lower portion 210 preferably comprises a container, as shown. The container comprises a bottom 285 and four walls 235, as shown (at least embodying herein walls surrounding said at least one receptacle). The container is preferably watertight, as shown.

Walls 235 and bottom 285 preferably are sealed at intersections together, as shown, preferably welded. Upon reading the teachings of this specification, those with ordinary skill in the art will now appreciate that, under appropriate circumstances, considering such issues as future technologies, manufacturing methods costs, etc., other watertight arrangements, such as, for example, coatings, liners, adhesives, etc., may suffice.

A front wall 270 of walls 235 of lower portion 210 preferably comprises at least one handle 275, preferably at least one finger-hole 277, preferably two finger-holes 277, as shown. Upon reading the teachings of this specification, those with ordinary skill in the art will now appreciate that, under appropriate circumstances, considering such issues as future technologies, costs, etc., other handles, such as, for example, knobs, grips, protrusions, indentations, rods, flanges, etc., may suffice.

Figure 4A:
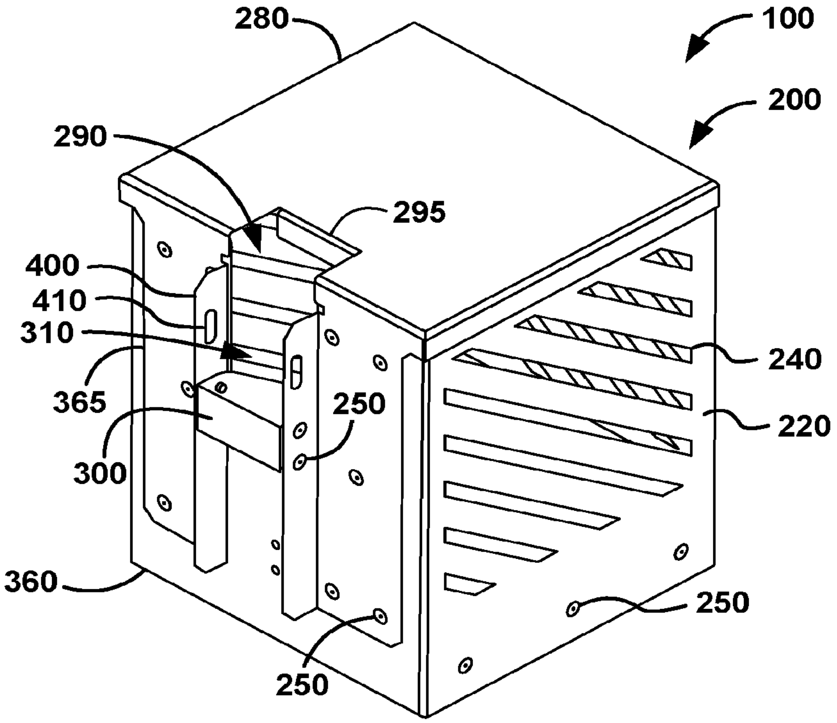
FIG. 4A shows a perspective view, illustrating an upper portion of the enclosure, according to the preferred embodiment of FIG. 2.
Figure 4B:
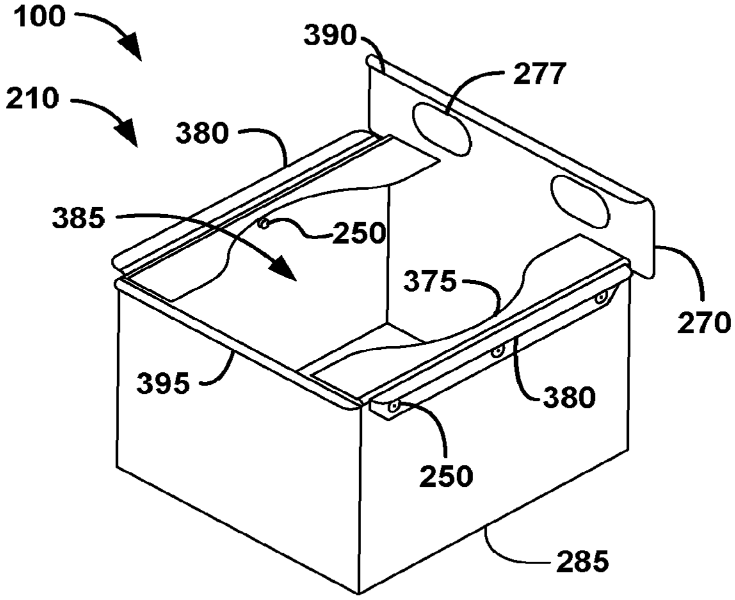
FIG. 4B shows a perspective view, illustrating a lower portion of the enclosure, according to the preferred embodiment of FIG. 2.

FIG. 3 shows an exploded view of the enclosure of the fluid containment system according to the preferred embodiment of FIG. 2. FIG. 4A shows a perspective view, illustrating an upper portion of the enclosure, according to the preferred embodiment of FIG. 2. FIG. 4B shows a perspective view, illustrating a lower portion of the enclosure, according to the preferred embodiment of FIG. 2.

The shell of upper portion 200 preferably further comprises two pieces assembled with fasteners 250, a first piece 330 and a second piece 320, as shown in FIG. 3. Upon reading the teachings of this specification, those with ordinary skill in the art will now appreciate that, under appropriate circumstances, considering such issues as manufacturing costs, future technologies, etc., other arrangements of construction, such as, for example, separate pieces for each side, single piece construction, etc., may suffice.

First piece 330 preferably comprises three walls 230, as shown in FIG. 3. Three walls 230 preferably comprise back wall 360 and two side walls 335, as shown in FIG. 3. Back wall 360 preferably comprises back notch 310, as shown in FIG. 3. Back notch 310 preferably comprises a rectangular notch from a top of the back wall 360 toward a center of back wall 360, preferably past the center of back wall 360, as shown in FIG. 3. Upon reading the teachings of this specification, those with ordinary skill in the art will now appreciate that, under appropriate circumstances, considering such issues as future technologies, costs, etc., other cutouts, such as, for example, circular punchouts, slot pass throughs, collars, etc., may suffice.

Second piece 320 preferably comprises top 280 and two walls 230, as shown in FIG. 3. Two walls 230 preferably comprise a back wall 365 and a front wall 355. Back wall 365 and back wall 360 preferably combine and overlap, as shown in FIGS. 3-4A. Back wall 365 preferably comprises two strips located to each side of back notch 310, as shown in FIG. 3. Upon reading the teachings of this specification, those with ordinary skill in the art will now appreciate that, under appropriate circumstances, considering such issues as future technologies, costs, mounting preferences, etc., other back wall structures, such as, for example, single layered walls, walls adjoining side walls, removably mounted walls, etc., may suffice.

Back wall 365 preferably further comprises two mount flanges 400, as shown in FIG. 4A. Mount flanges 400 preferably extend from back wall 365, as shown in FIG. 4A. Mount flanges 400 preferably are located on each side of back notch 310, as shown in FIG. 4A. Mount flanges 400 preferably comprise drain mounts 410, as shown in FIG. 4A, permitting enclosure 140 to mount on drain 130. Upon reading the teachings of this specification, those with ordinary skill in the art will now appreciate that, under appropriate circumstances, considering such issues as future technologies, costs, etc., other mounts, such as, for example, hanging mounts, collar mounts, flush mounts, mounts to cooking enclosure, bracket mounts, etc., may suffice.

Drain mounts 410 preferably comprise mounting holes, as shown in FIG. 4A. Upon reading the teachings of this specification, those with ordinary skill in the art will now appreciate that, under appropriate circumstances, considering such issues as future technologies, costs, etc., other mounts, such as, for example, plates, hooks, bayonet slots, rods, thumb screws, bolts, etc., may suffice.

Back notch 310 preferably accommodates a drainage channel 300, as shown in FIG. 3, and drain 130. Drainage channel 300 preferably mounts between the two strips of back wall 365, as shown in FIGS. 3-4A. Drainage channel 300 preferably mounts to mount flanges 400 using fasteners 250, as shown in FIG. 4A. Drainage channel 300 preferably passes through back notch 310, as shown in FIG. 4A. Drainage channel 300 directs the fluids from drain 130 to a center portion of upper portion 200 (see FIG. 5). Upon reading the teachings of this specification, those with ordinary skill in the art will now appreciate that, under appropriate circumstances, considering such issues as future technologies, costs, etc., other drainage channel mounts, such as, for example, bracket mounts, flush mounts, collar mounts, brace mounts, etc., may suffice.

First piece 330 preferably further comprises at least one rail slot on each side wall 335 of walls 230, as shown in FIG. 3. The at least one rail slot preferably forms from rail flange 340 and protrusion flange 345, as shown in FIG. 3. Rail flange 340 preferably extends perpendicular to a bottom edge of side wall 335, as shown in FIG. 3. Protrusion flange 345 preferably mounts to side wall 335, as shown in FIG. 3. Protrusion flange 345 preferably is located above rail flange 345 leaving the at least one rail slot, as shown in FIG. 3. Rail flange 345 preferably extends from about back wall 360 the width of side wall 335, as shown in FIG. 3. Protrusion flange 345 preferably is centered along length of rail flange 345, as shown in FIG. 3. Protrusion flange 345 preferably is shorter than rail flange 345, as shown in FIG. 3.

Side walls 335 of first piece 330 preferably comprise at least one front flange 350, as shown in FIG. 3. Front flange 350 preferably assembles to front wall 355 with fasteners 250, as shown in FIG. 3. Upon reading the teachings of this specification, those with ordinary skill in the art will now appreciate that, under appropriate circumstances, considering such issues as manufacturing costs, future technologies, etc., other arrangements of construction, such as, for example, separate pieces for each side, single piece construction, etc., may suffice.

Lower portion 210 preferably further comprises at least one rail 380, as shown in FIG. 3. Rail 380 preferably mounts to each side of lower portion 210 corresponding to the at least one rail slot of upper portion 200, as shown in FIG. 3. Rail 380 preferably slides into and out of the at least one rail slot, as shown in FIG. 3. Upon reading the teachings of this specification, those with ordinary skill in the art will now appreciate that, under appropriate circumstances, considering such issues as future technologies, costs, etc., other removable interconnections between upper portion and lower portion, such as, for example, bayonet locking, roller slides, screw mounting, door openings, etc., may suffice.

Lower portion 210 preferably further comprises at least one back flange 395, as shown in FIG. 3. Back flange 395 extends from a back side of lower portion 210, which is inserted first into upper portion 200, as shown in FIG. 3. Back flange 395 preferably stops lower portion 210 when slid on rail 380 to a fully inserted state (see FIG. 5). Upon reading the teachings of this specification, those with ordinary skill in the art will now appreciate that, under appropriate circumstances, considering such issues as future technologies, costs, etc., other stops, such as, for example, protrusions, screws, stops mounted on back wall, posts, notches, etc., may suffice.

Lower portion 210 preferably further comprises at least one receptacle support 375, as shown in FIG. 3. Receptacle support 375 preferably suspends a receptacle 370 in lower portion 210, as shown in FIG. 3 (at least embodying herein at least one receptacle support structured and arranged to support said at least one receptacle). Receptacle support 375 preferably comprises at least one flange, preferably at least one curved flange, as shown in FIG. 3. Receptacle support 375 preferably extends from a top of a side wall of walls 235 inward toward a center of lower portion 210, as shown in FIG. 3. Receptacle support 375 preferably creates an opening 385 at a top of lower portion 210, preferably a shaped opening, preferably shaped to at least partially match a side of receptacle 370, as shown in FIG. 3. Upon reading the teachings of this specification, those with ordinary skill in the art will now appreciate that, under appropriate circumstances, considering such issues as future technologies, costs, etc., other receptacle supports, such as, for example, wire frames, rings, braces, posts offset platforms, etc., may suffice.

Receptacle 370 preferably comprises a bucket, alternately preferably a bucket liner, as shown in FIG. 3. Upon reading the teachings of this specification, those with ordinary skill in the art will now appreciate that, under appropriate circumstances, considering such issues as future technologies, costs, etc., other receptacles, such as, for example, canisters, cups, absorbent materials, atomizers, binders, etc., may suffice.

Figure 5:
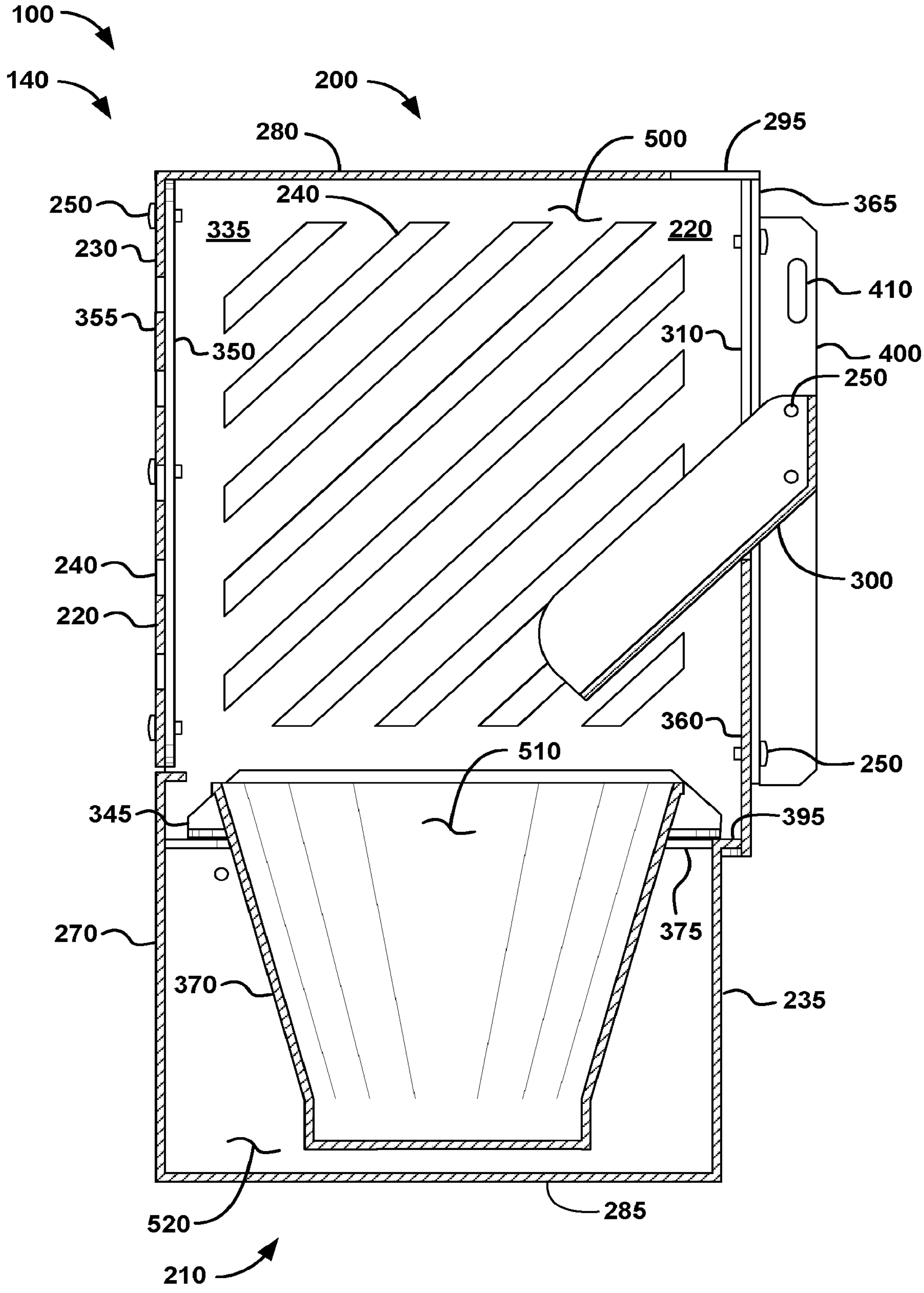
FIG. 5 shows the sectional view 5-5 of FIG. 2 according to the preferred embodiment of FIG. 1.

Receptacle 370 preferably is centered by receptacle support 375 inside lower portion 210 (see FIG. 5). When lower portion 210 is fully inserted into upper portion 200, drainage channel 300 preferably is over receptacle 370 (see FIG. 5). The fluids running down drainage channel 300 preferably drop off drainage channel 300 into receptacle 370. Front wall 270 of lower portion 210 preferably extends above receptacle support 375, as shown in FIGS. 3 and 4B. Finger-holes 277 preferably are above receptacle support 375, as shown in FIGS. 3 and 4B. Front wall 270 preferably comprises at least one top flange 390, as shown in FIG. 3. Top flange 390 preferably extends perpendicularly inward from a top of front wall 270, as shown in FIG. 3.

FIG. 5 shows the sectional view 5-5 of FIG. 2 according to the preferred embodiment of FIG. 1. Upper portion 200 preferably comprises an upper cavity 500 inside the shell of upper portion 200, as shown. Lower portion 210 preferably comprises a lower cavity 520, as shown. Receptacle 370 (at least embodying herein at least one receptacle structured and arranged to receive and collect fluid draining from the outdoor cooking device generated by food cooking within a cooking enclosure of the outdoor cooking device) preferably comprises a receptacle cavity 510, as shown. The liquids from drain 130 enter enclosure 140 and run down drainage channel 300. The liquids run off drainage channel 300 and enter receptacle cavity 510. Heat from the liquids rises into upper cavity 500. Air flows through ventilation panel 220 carrying the heat from upper cavity 500 to an outdoor environment to which enclosure 140 is preferably directly exposed (at least herein embodying wherein said enclosure is directly exposed to the outdoor environment while mounted on the outdoor cooking device).

Lower cavity 520 creates an insulation between walls of receptacle 370 and walls 235 of lower portion, as shown (at least herein embodying wherein said enclosure comprises at least one insulation layer between said receptacle and said walls). The insulation preferably comprises an air gap in lower cavity 520, as shown. Therefore, heat is dissipated from the liquids preferably without heating enclosure 140 enough to cause burns through casual contact with enclosure 140. Upon reading the teachings of this specification, those with ordinary skill in the art will now appreciate that, under appropriate circumstances, considering such issues as future technologies, costs, etc., other insulations, such as, for example, water, foams, vacuum layers, ceramics, sand, etc., may suffice.

Figure 6:
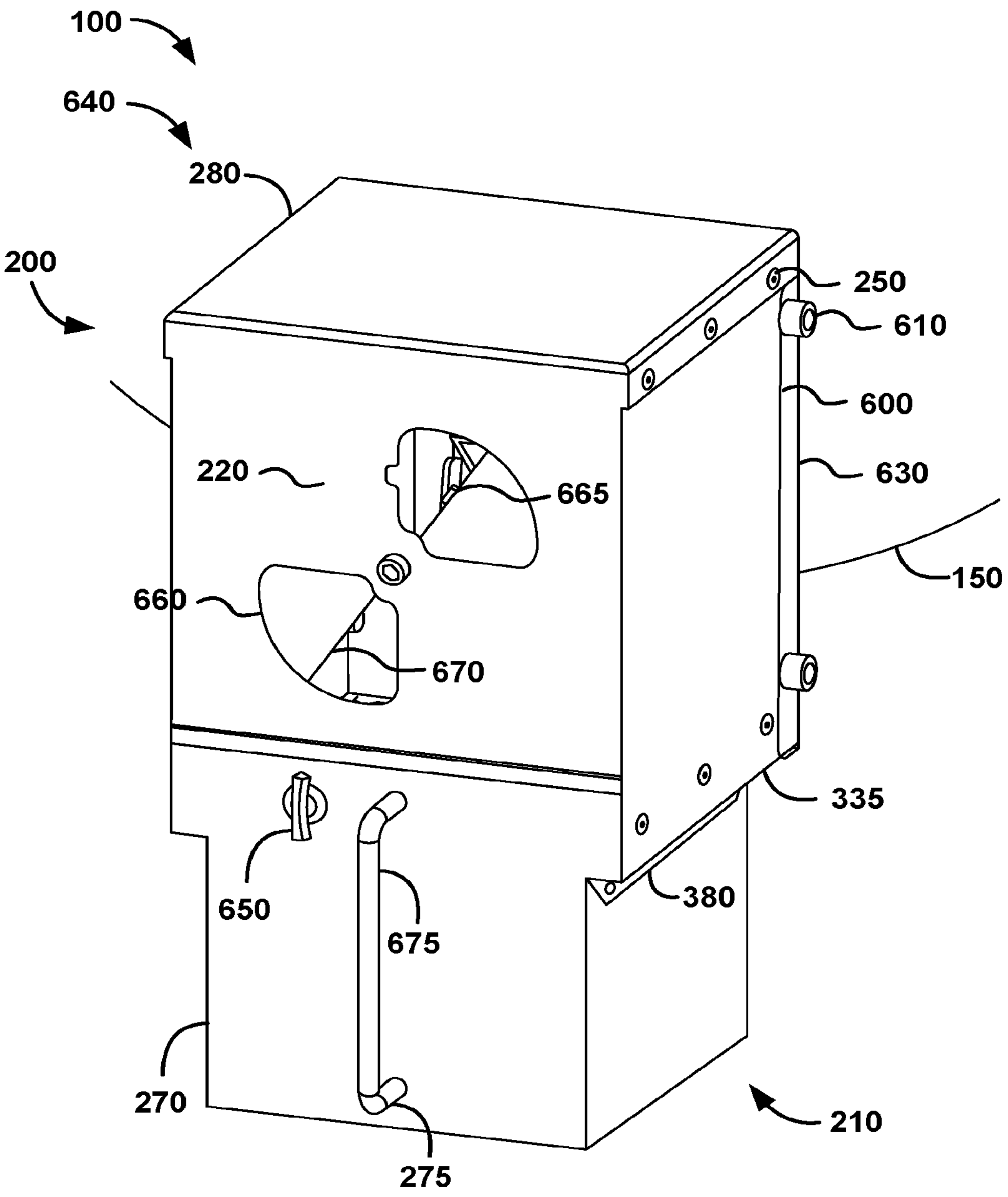
FIG. 6 shows a perspective view illustrating a fluid containment system according to an alternately preferred embodiment of the present invention.

FIG. 6 shows a perspective view illustrating a fluid containment system 100 according to an alternately preferred embodiment of the present invention. Fluid containment system 100 alternately preferably comprises enclosure 640, as shown. Although many of the elements of enclosure 640 are repeated from enclosure 140, as shown in FIG. 6, enclosure 640 utilizes bar handle 675 instead of finger holes 277 for handle 275 and back wall 630 instead of back wall 360 and back wall 365 on upper portion 200 and vent 660 instead of vent 240, as shown.

Lower portion 210 preferably comprises front wall 270, as shown. Front wall 270 preferably comprises handle 275, as shown. Handle 275 preferably comprises bar handle 675, as shown. Bar handle 675 preferably extends from front wall 270, as shown, and provides a bar to grasp with a hand. Upon reading the teachings of this specification, those with ordinary skill in the art will now appreciate that, under appropriate circumstances, considering such issues as future technologies, costs, etc., other handles, such as, for example, knobs, grips, protrusions, indentations, rods, flanges, etc., may suffice.

Further, front wall 270 preferably comprises at least one latching mechanism 650, as shown. Latching mechanism 650 preferably comprises a turning latch, as shown, comprising a cam inside enclosure 640. Latching mechanism 650 preferably latches lower portion 210 to upper portion 200, as shown, such that to access receptacle 270 latching mechanism must be unlatched prior to pulling handle 275 to disengage lower portion 210 from upper portion 200. Upon reading the teachings of this specification, those with ordinary skill in the art will now appreciate that, under appropriate circumstances, considering such issues as future technologies, costs, etc., other latching mechanisms, such as, for example, locks, bolts, chains, spring-loaded throws, etc., may suffice.

Figure 7:
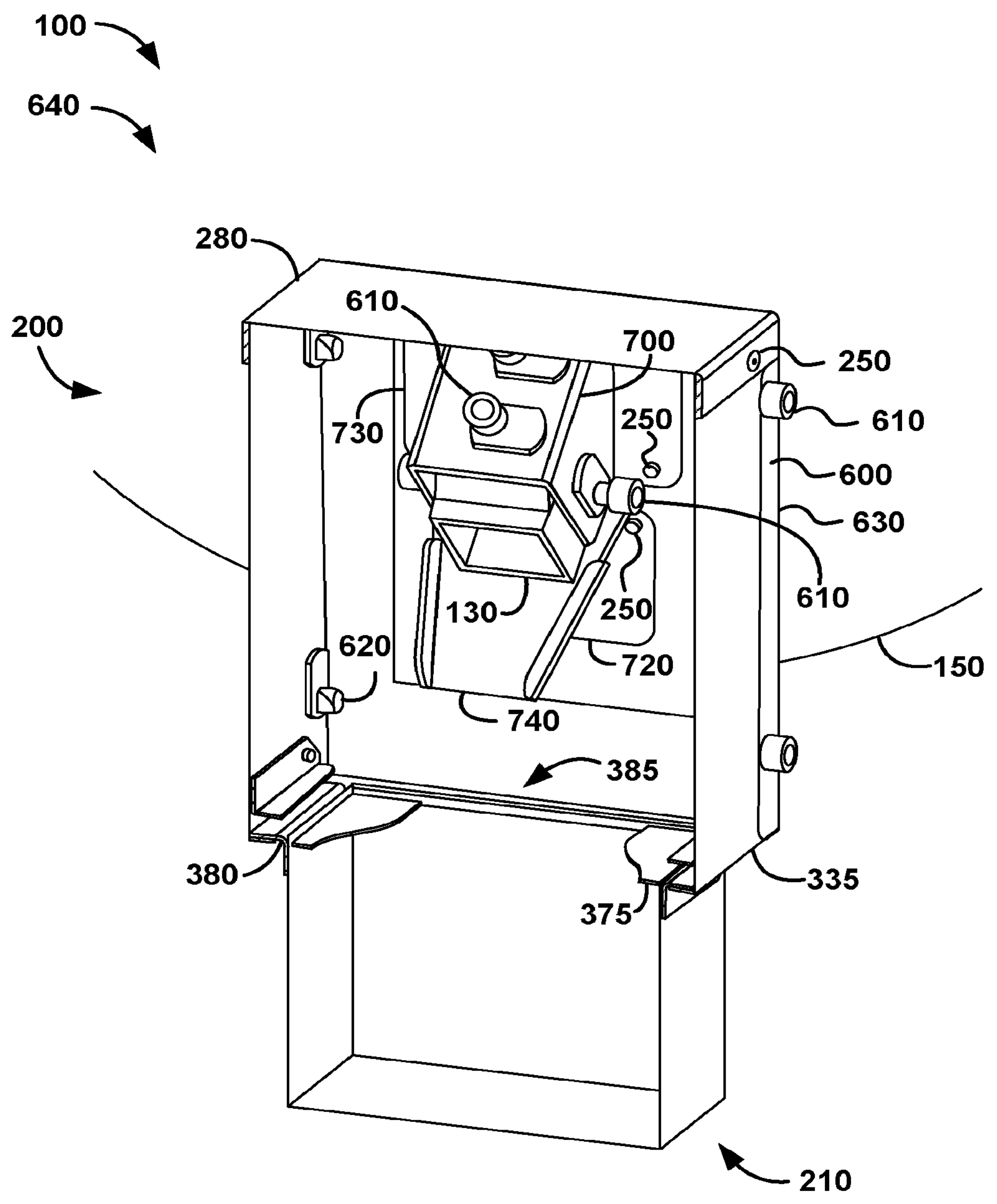
FIG. 7 shows a perspective cutaway view, illustrating an interior of the enclosure of the fluid containment system, according to the preferred embodiment of FIG. 6.
Figure 8:
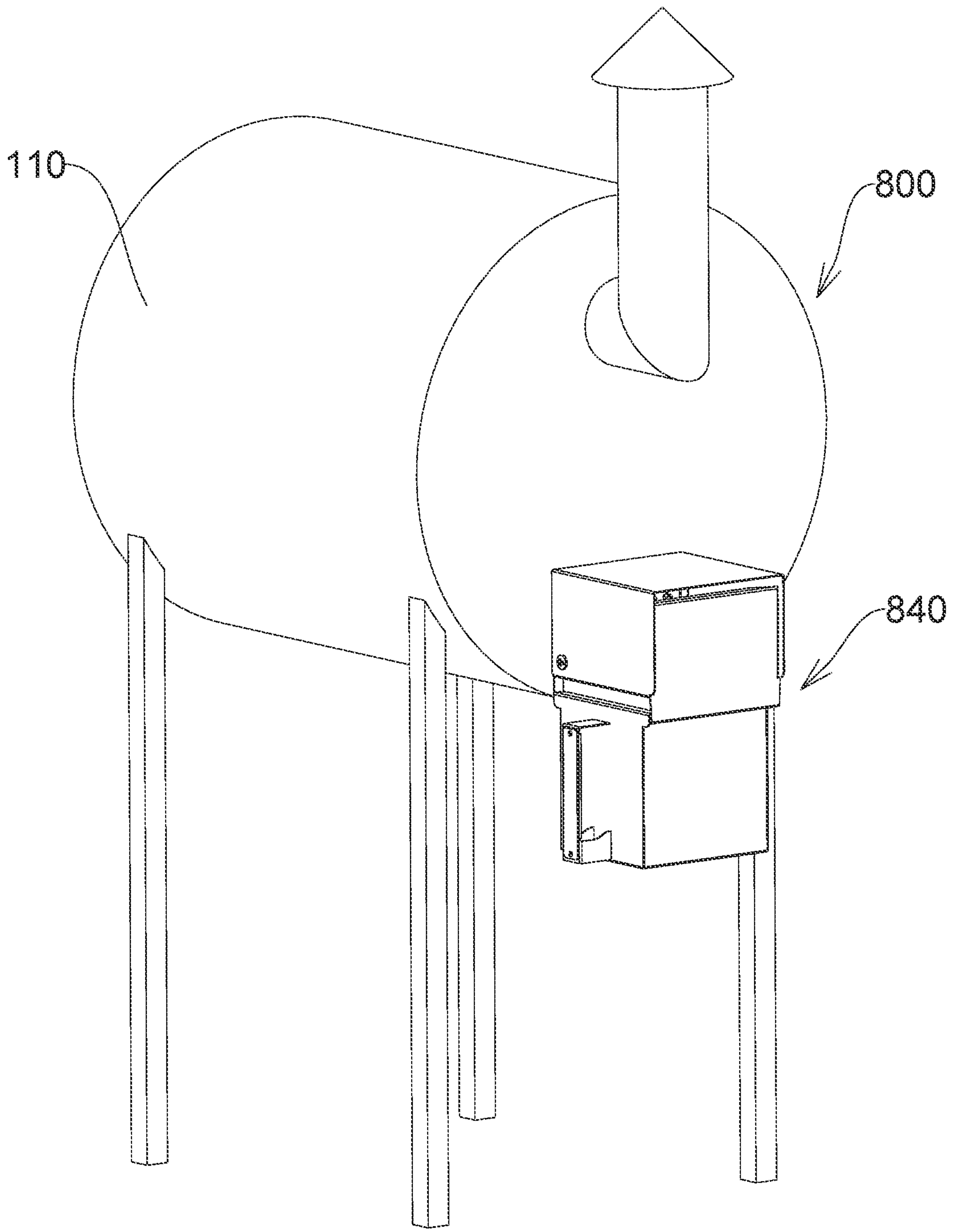
FIG. 8 shows a perspective view of a first alternative embodiment of a fluid containment system in use on an outdoor cooking device.
Figure 9A:
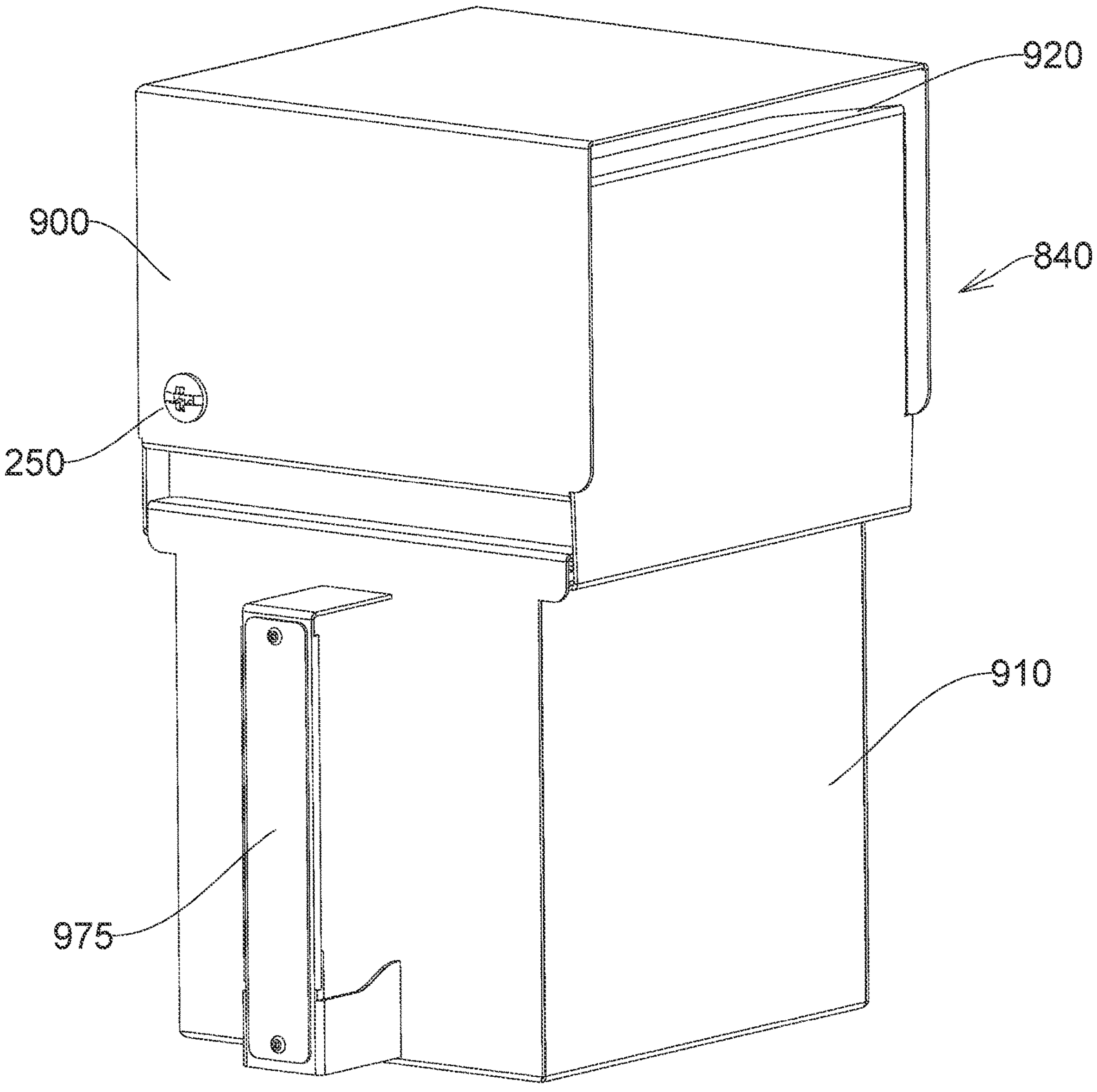
FIGS. 9A-9B show perspective views of the first alternative embodiment of the fluid containment system of FIG. 8 detached from the outdoor cooking device.
Figure 9B:
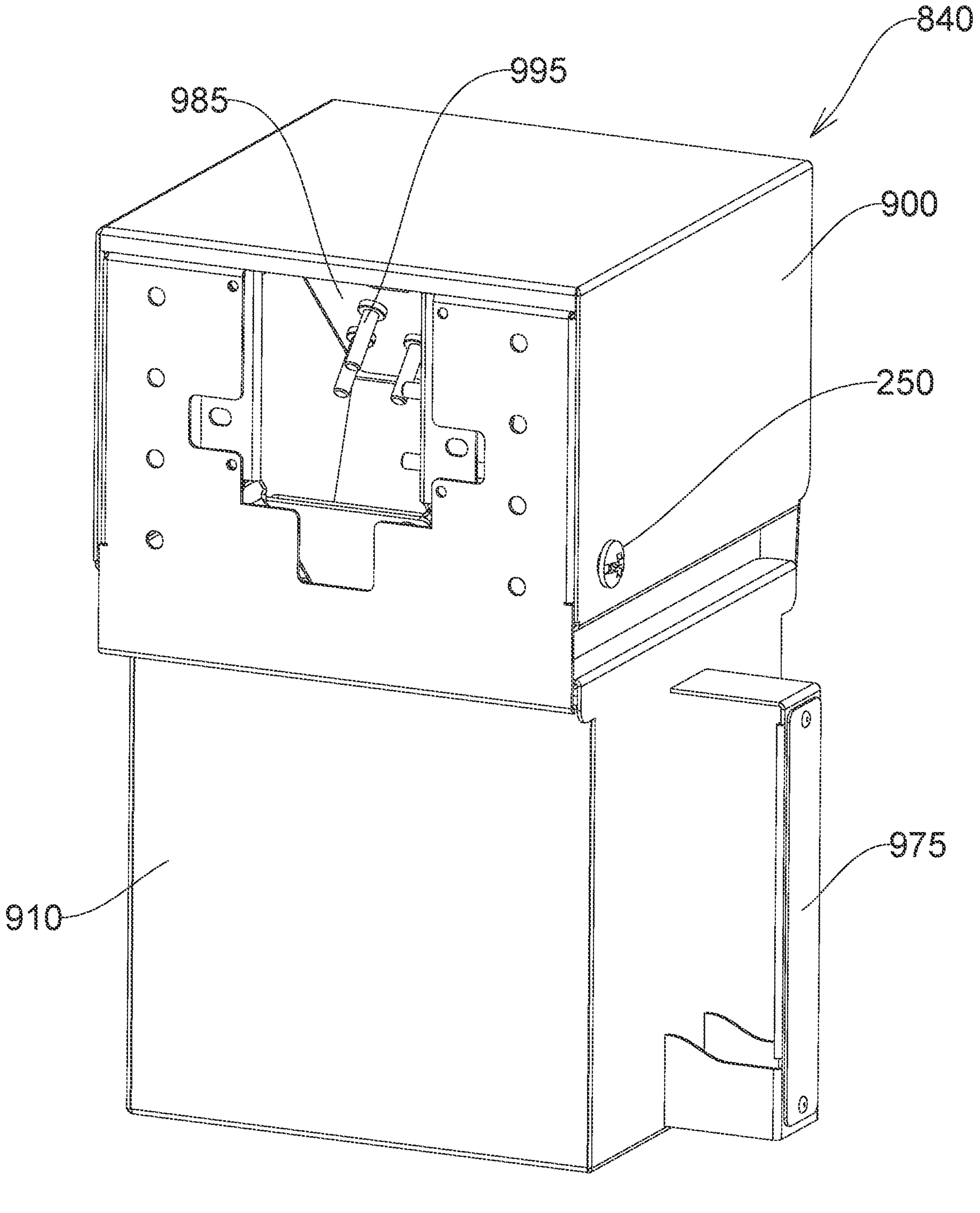
Figure 10:
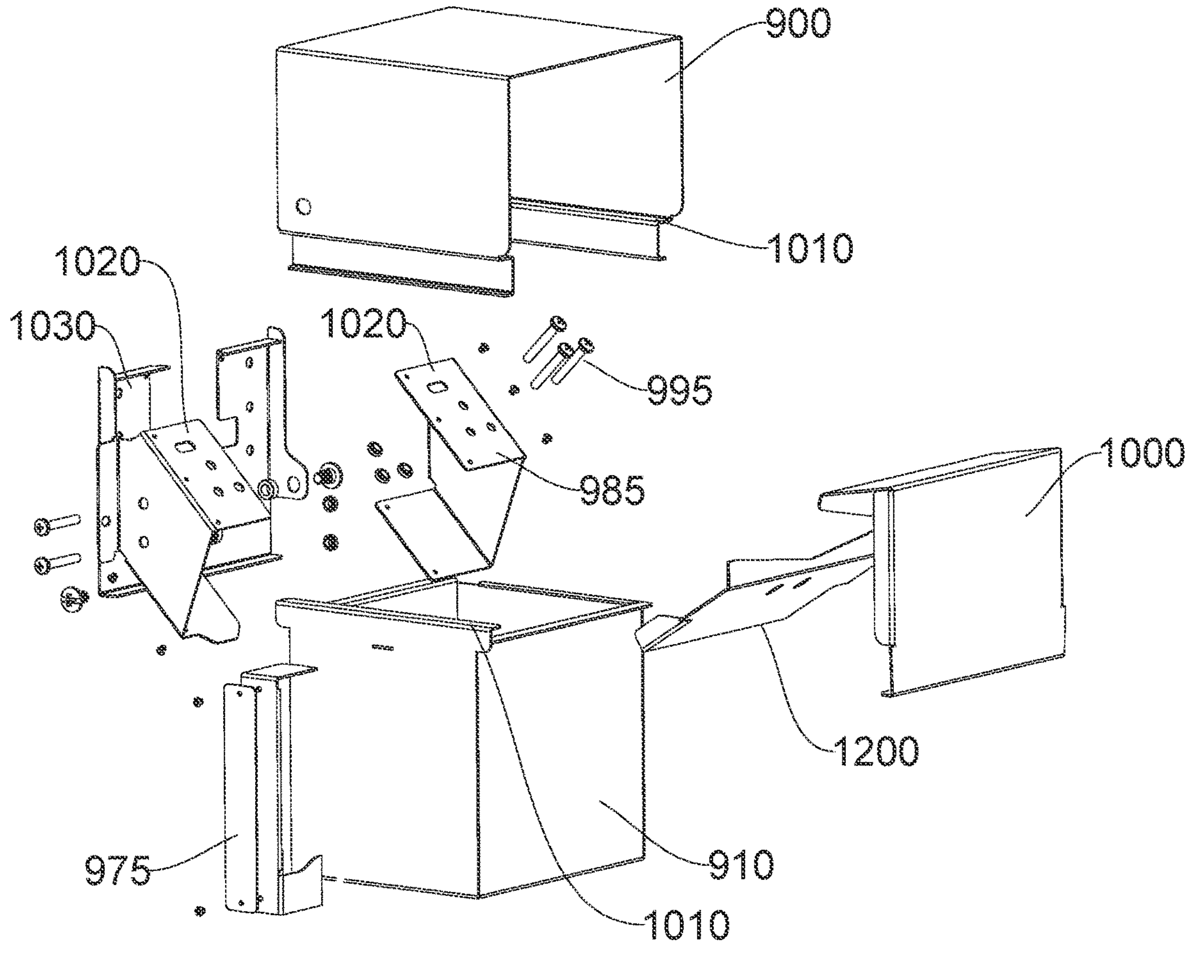
FIG. 10 shows an exploded view of the first alternative embodiment of the fluid containment system of FIGS. 8-9B.
Figure 11:
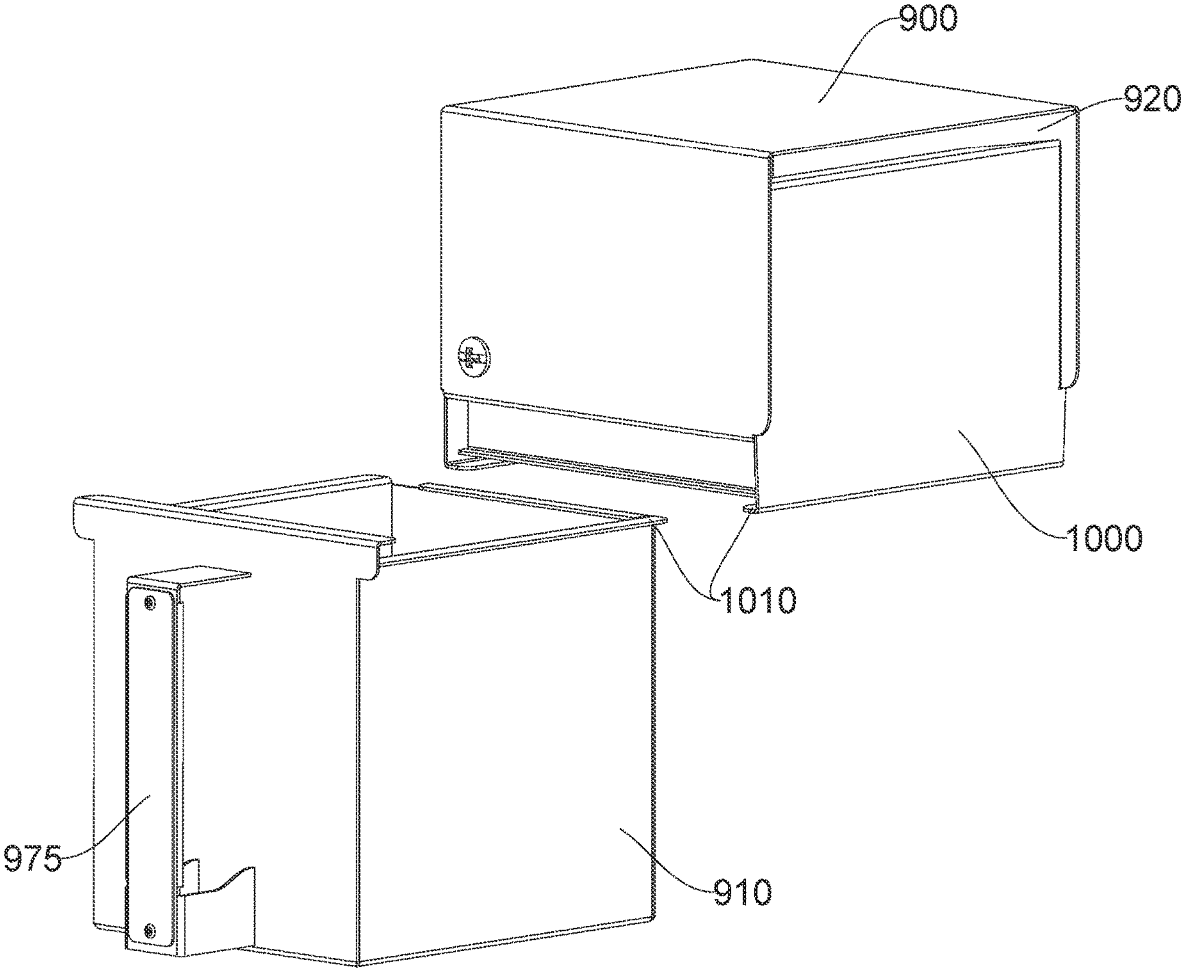
FIG. 11 shows the first alternative embodiment of the fluid containment system of FIGS. 8-10 in and open position.
Figure 12B:
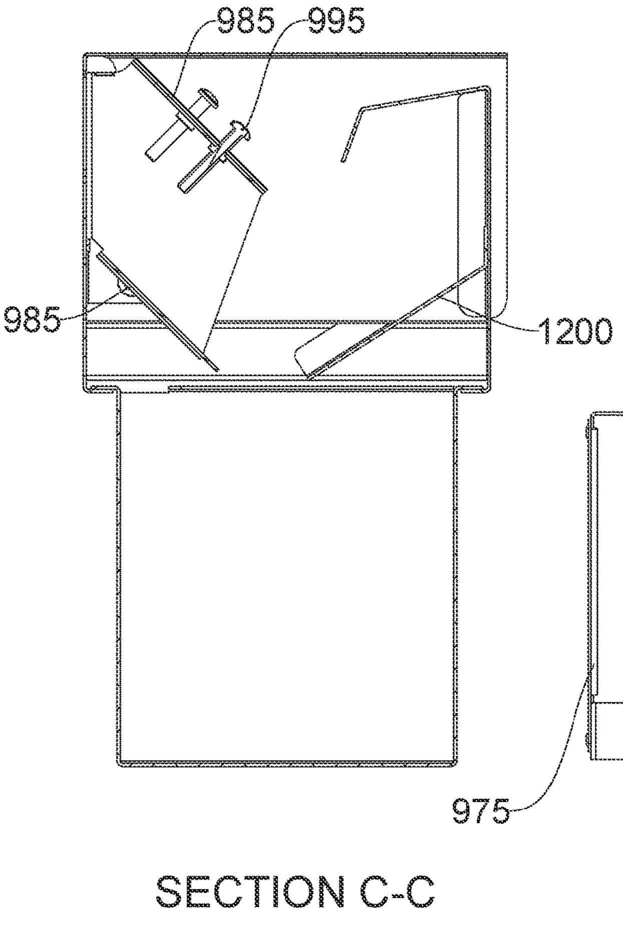
FIG. 12B shows the sectional view C-C of FIG. 12A.
Figure 12A:
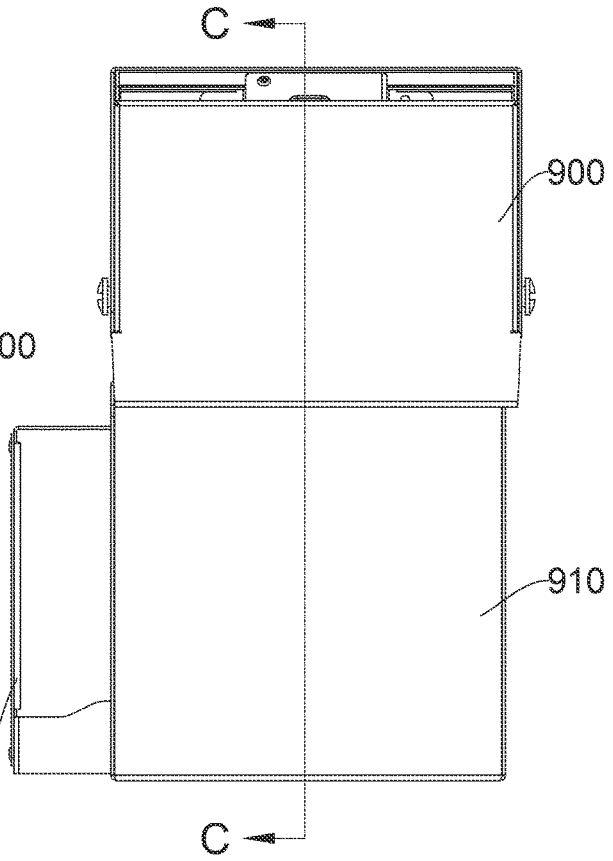
FIG. 12A shows the first alternative embodiment of the fluid containment system of FIGS. 8-11.
Figure 13B:
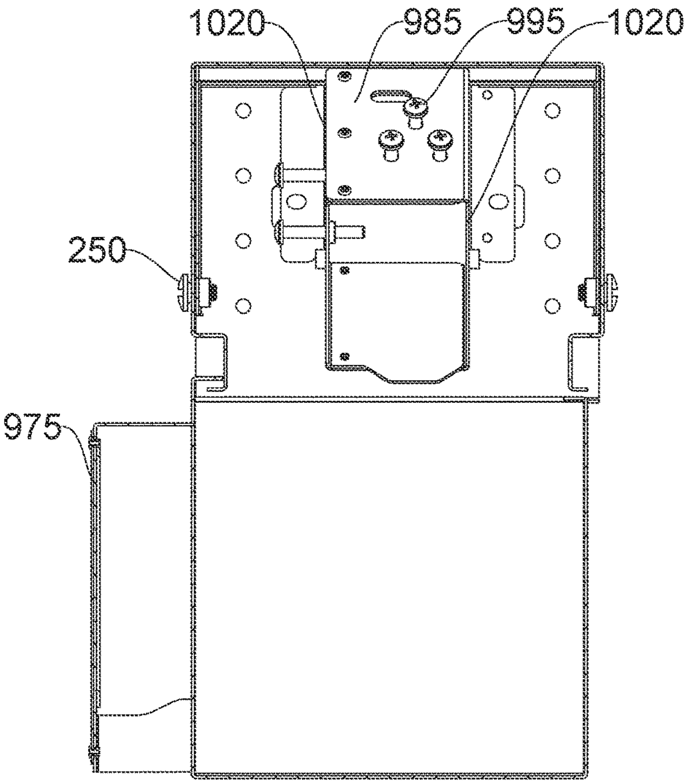
FIG. 13B shows the sectional view of D-D of FIG. 13A.
Figure 13A:
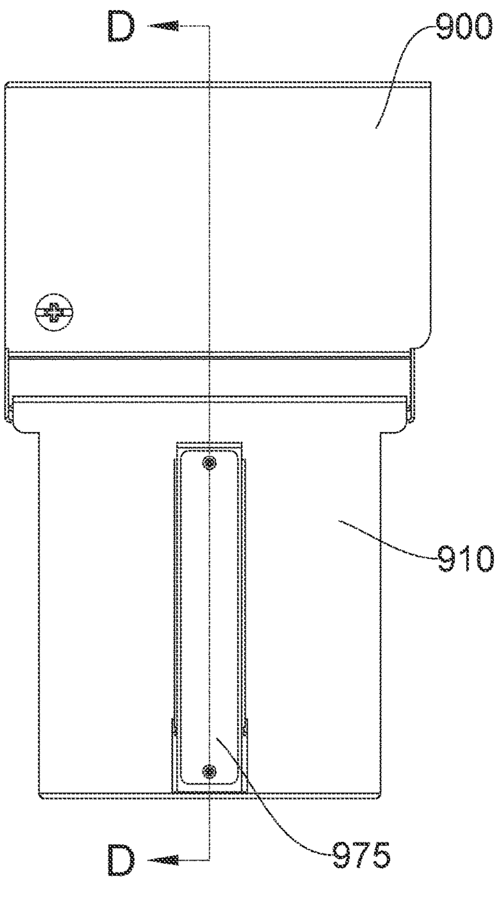
FIG. 13A shows the first alternative embodiment of the fluid containment system of FIGS. 8-12B.
Figure 14:
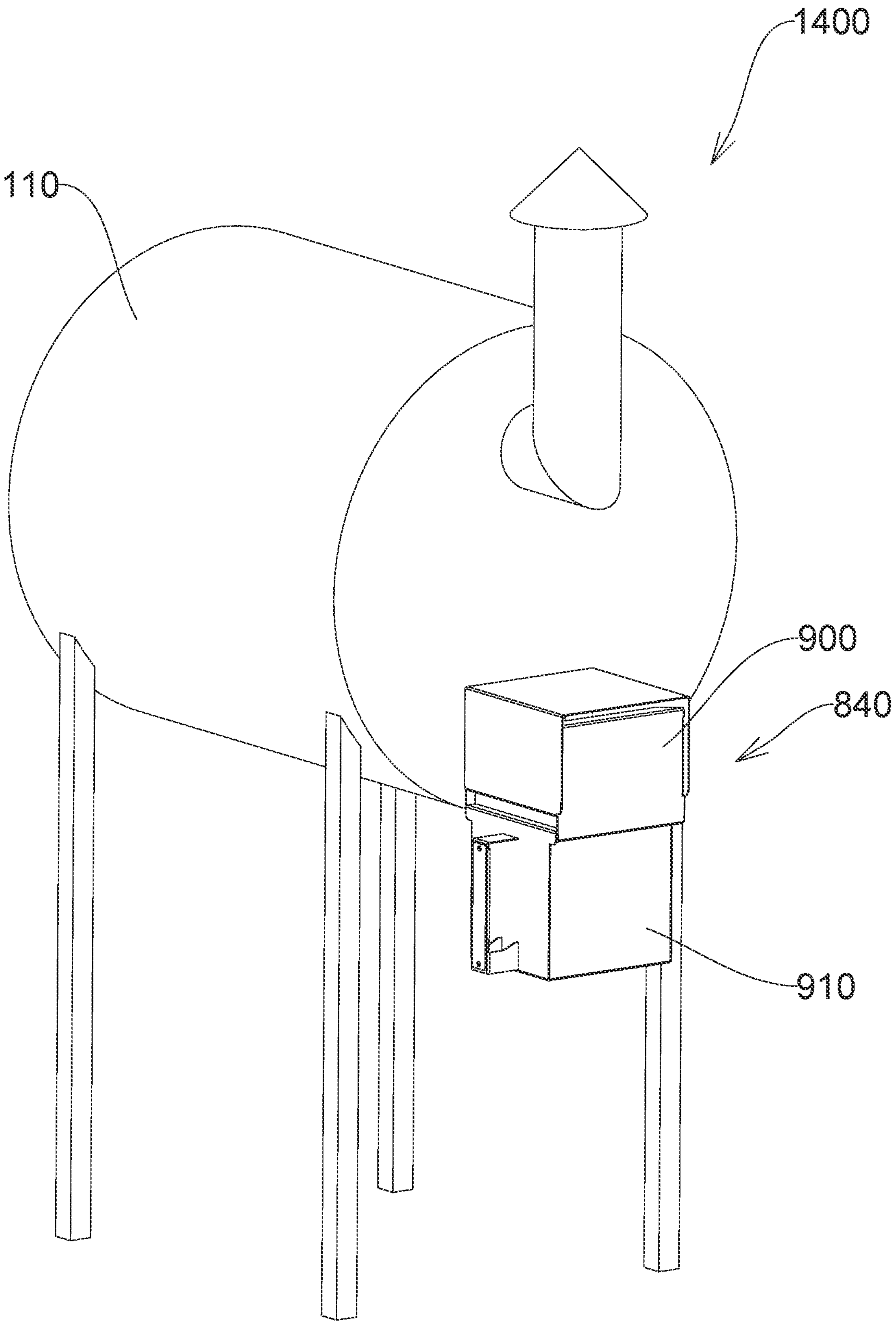
FIGS. 14-15 shows perspective views of a second alternative embodiment of a fluid containment system configured to be welded to an outdoor cooking device.
Figure 15:
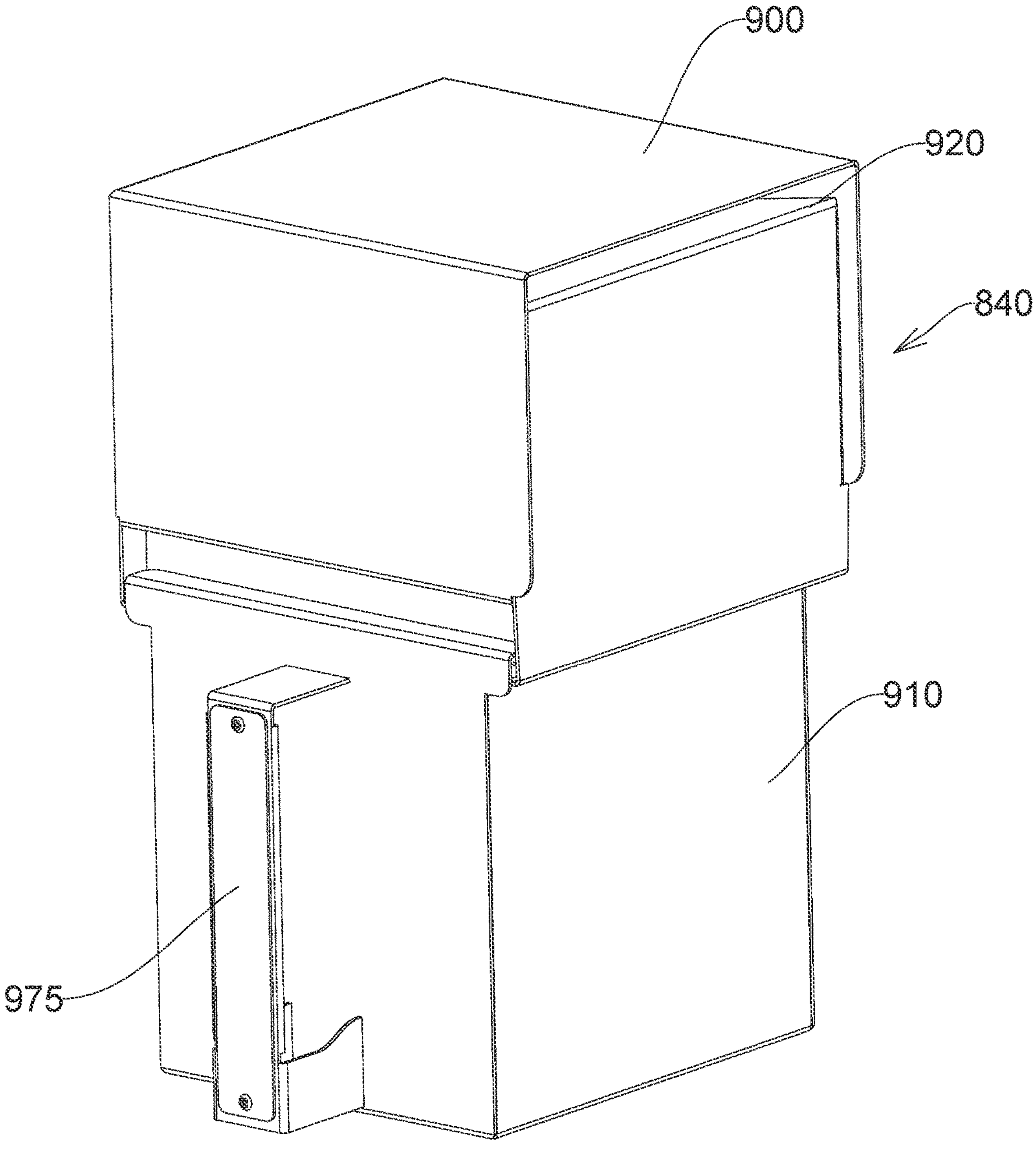
Figure 16:
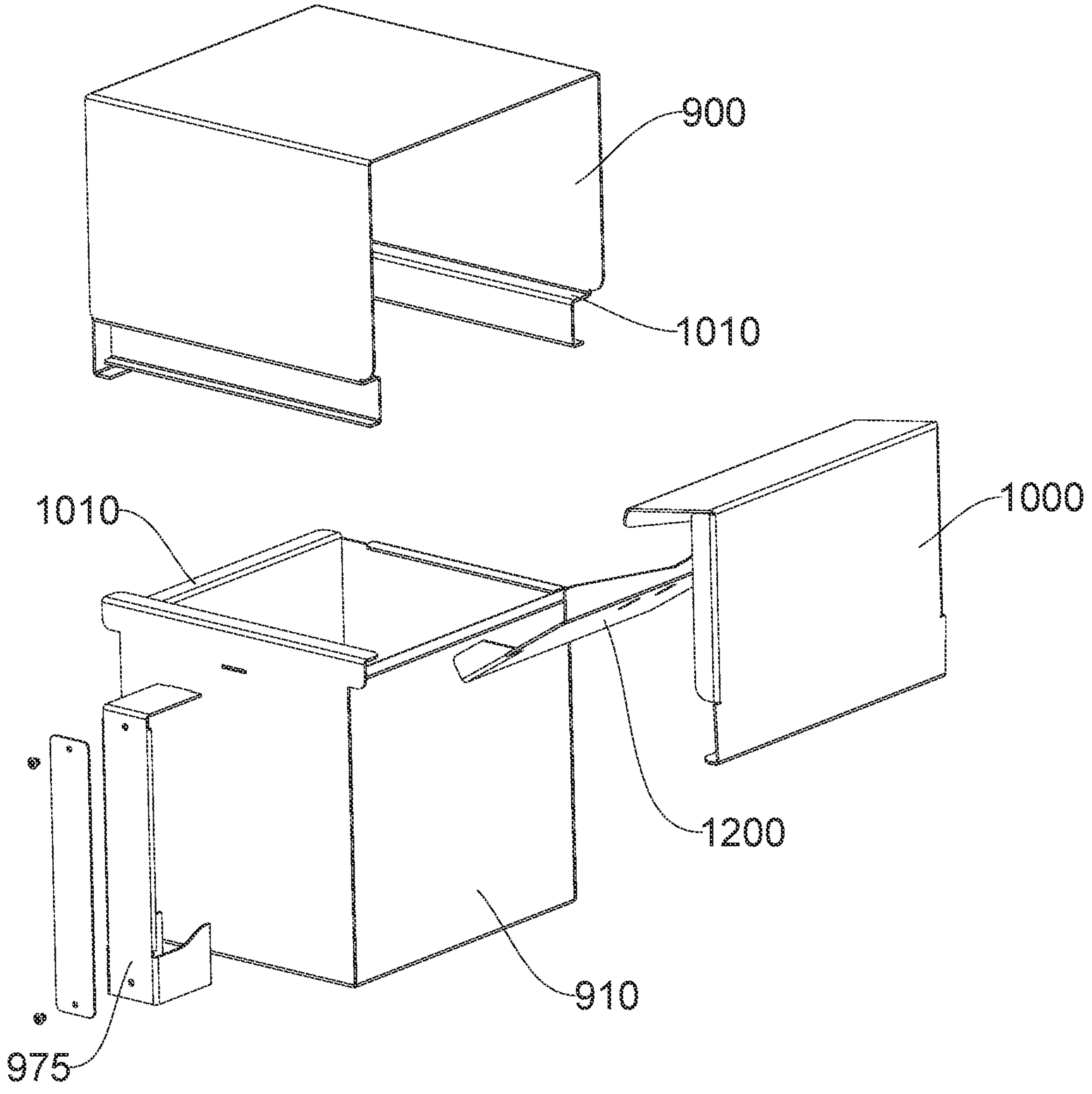
FIG. 16 shows an exploded view of the second alternative embodiment of the fluid containment system of FIGS. 14-15.
Figure 17:
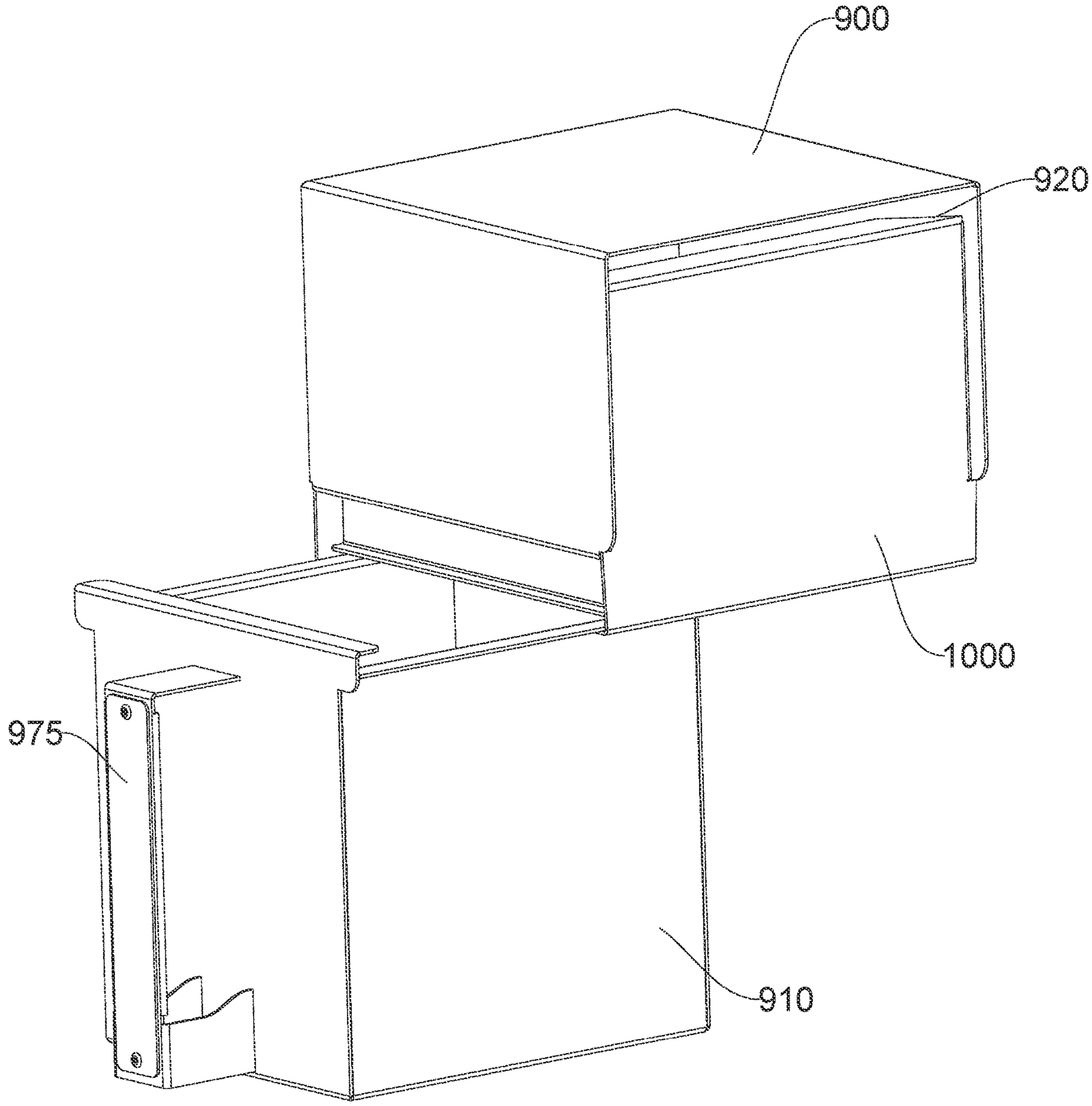
FIG. 17 shows a perspective view of the second alternative embodiment of the fluid containment system of FIGS. 14-16 in an open position.
Figure 18B:
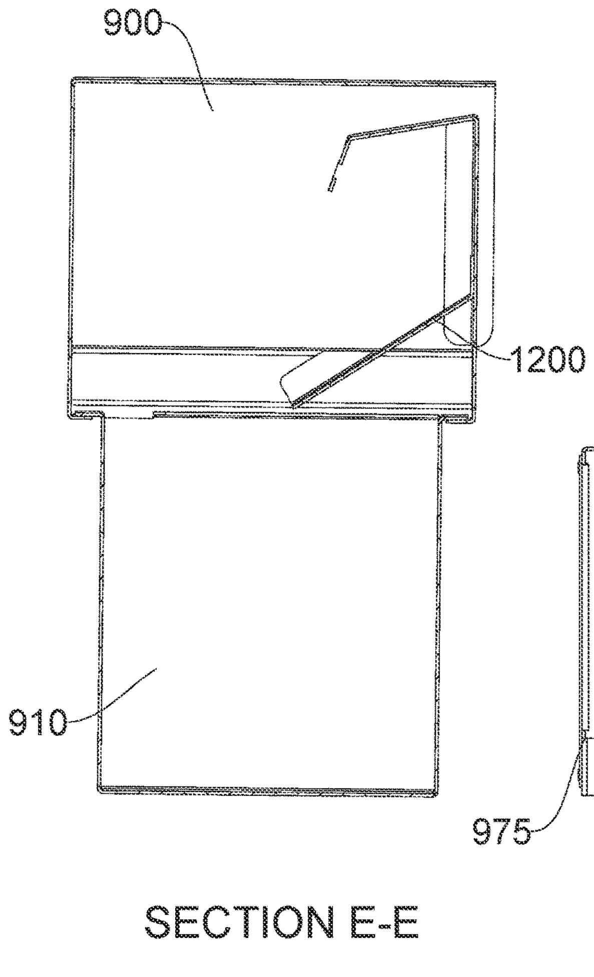
FIG. 18B shows the sectional view E-E of FIG. 18A.
Figure 18A:
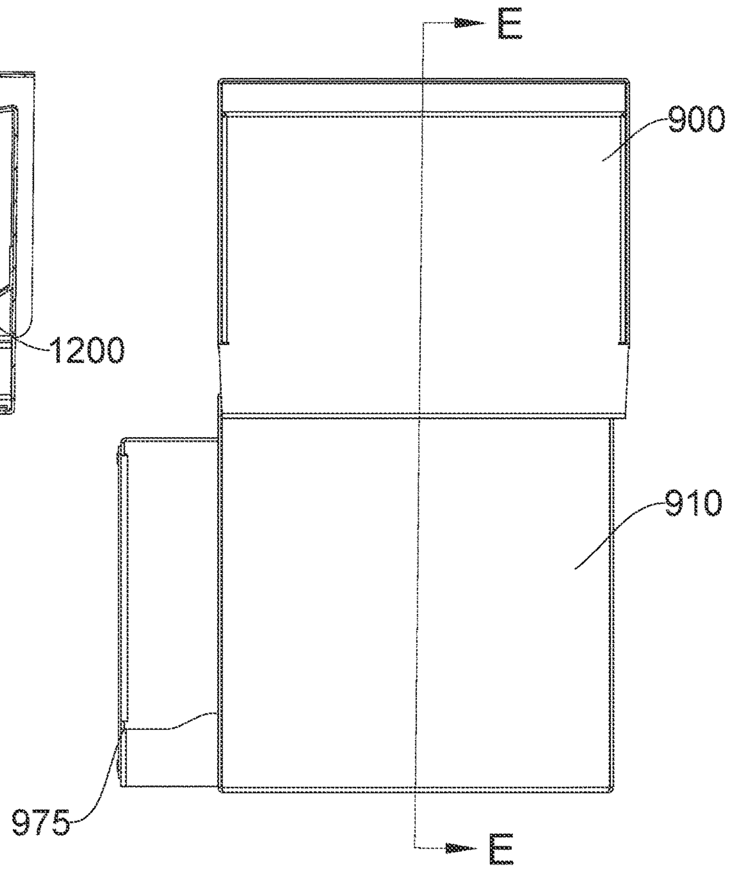
FIG. 18A shows the second alternative embodiment of the fluid containment system of FIGS. 14-17.
Figure 19B:
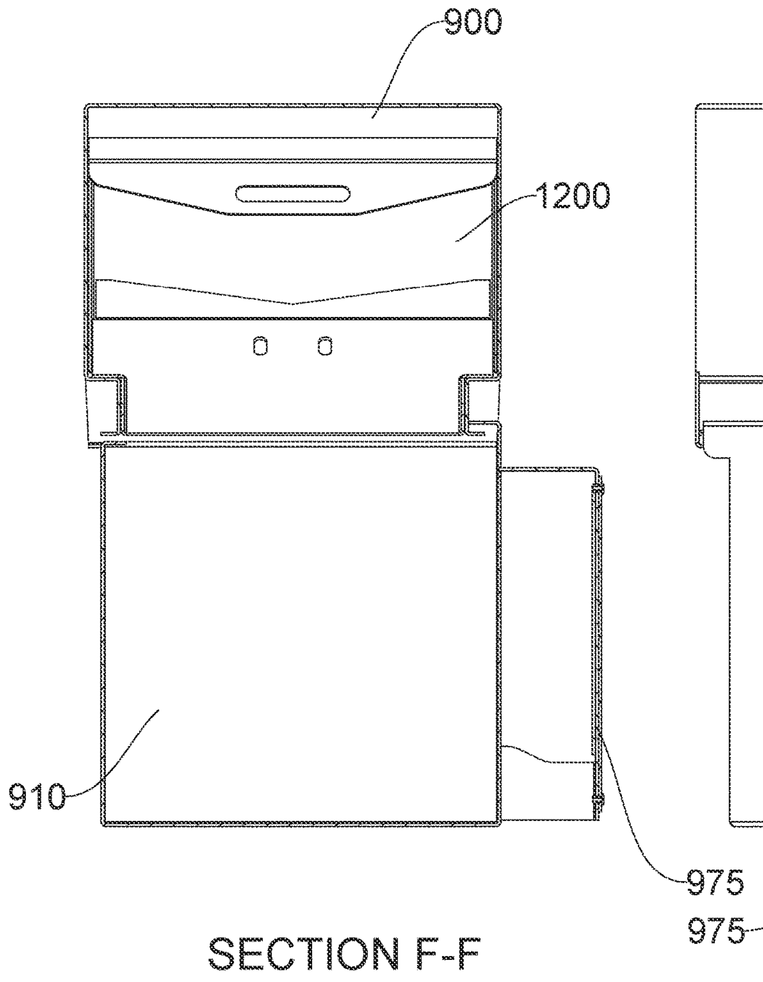
FIG. 19B shows the sectional view of F-F of FIG. 19A.
Figure 19A:
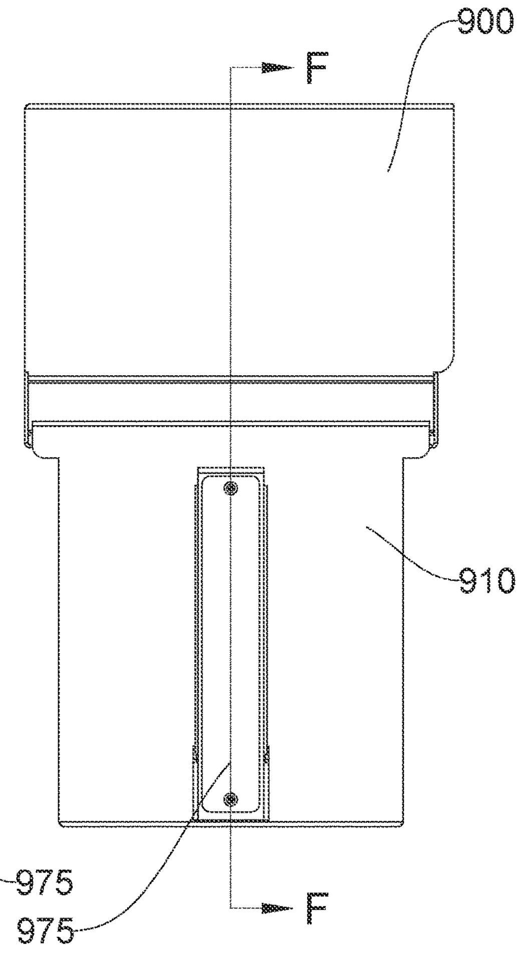
FIG. 19A shows the first alternative embodiment of the fluid containment system of FIGS. 14-18B.
Figure 20:
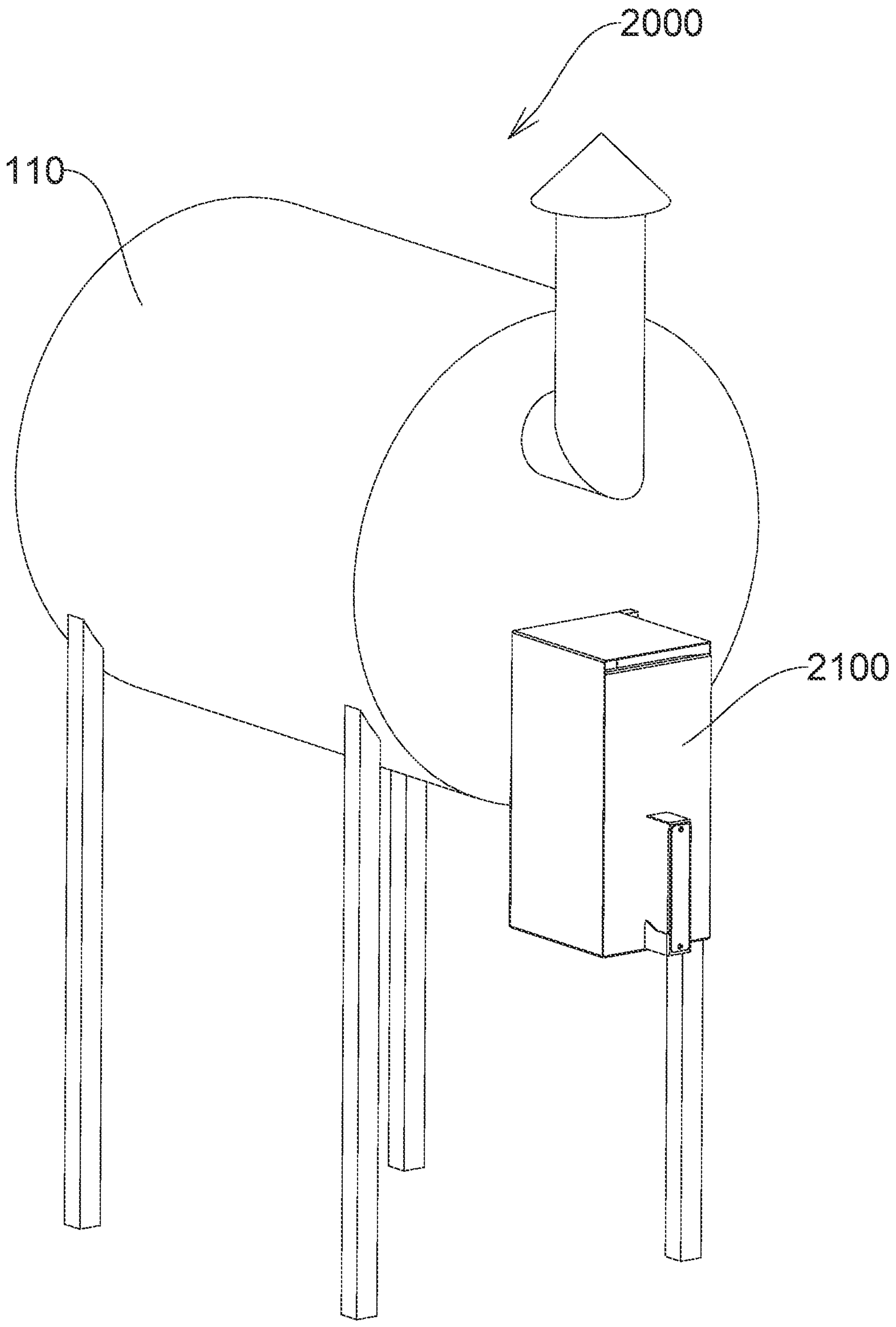
FIGS. 20-21 show perspective views of a third alternative embodiment of a fluid containment system configured to hingedly couple to an outdoor cooking device.
Figure 21:
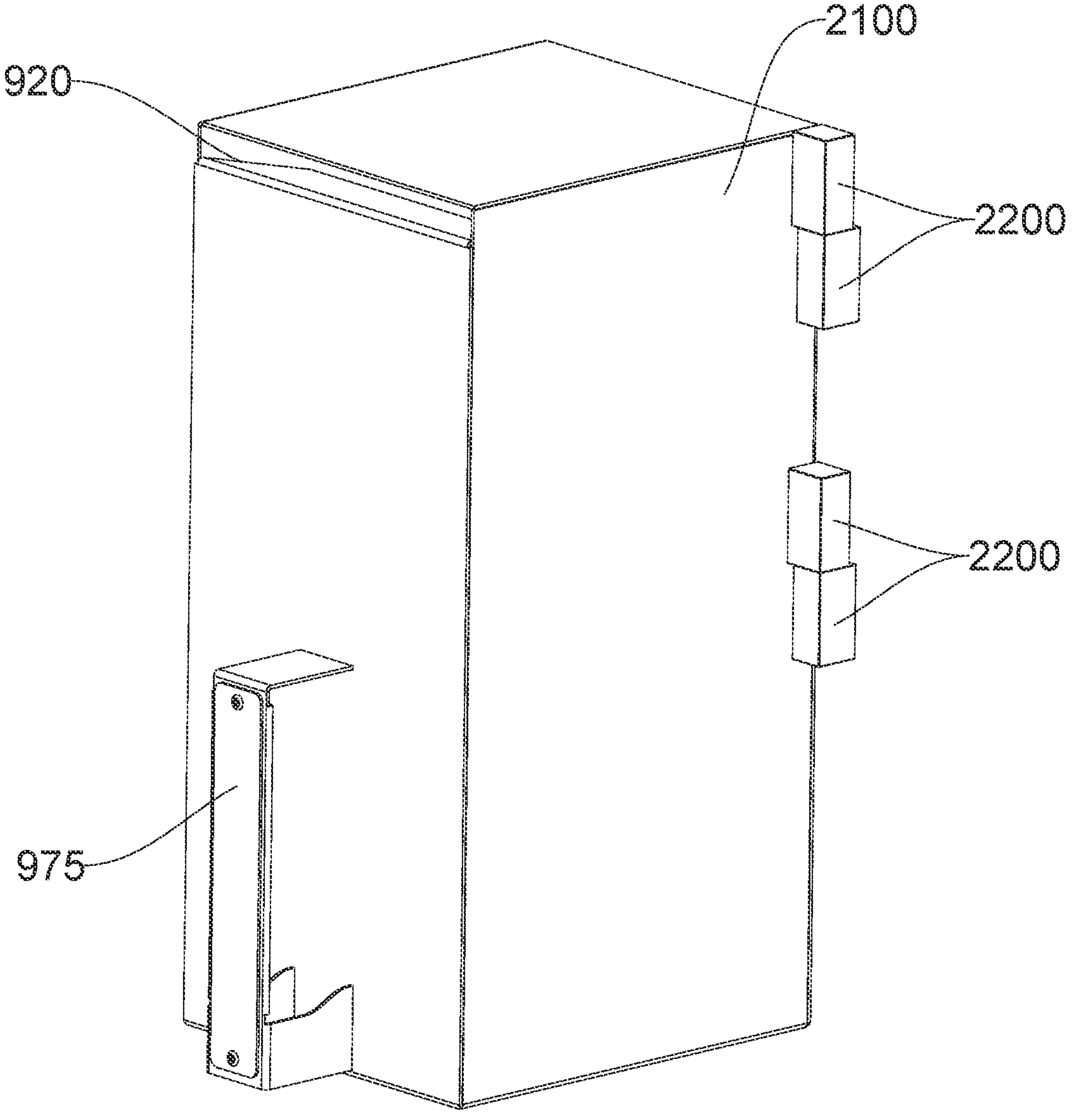
Figure 22:
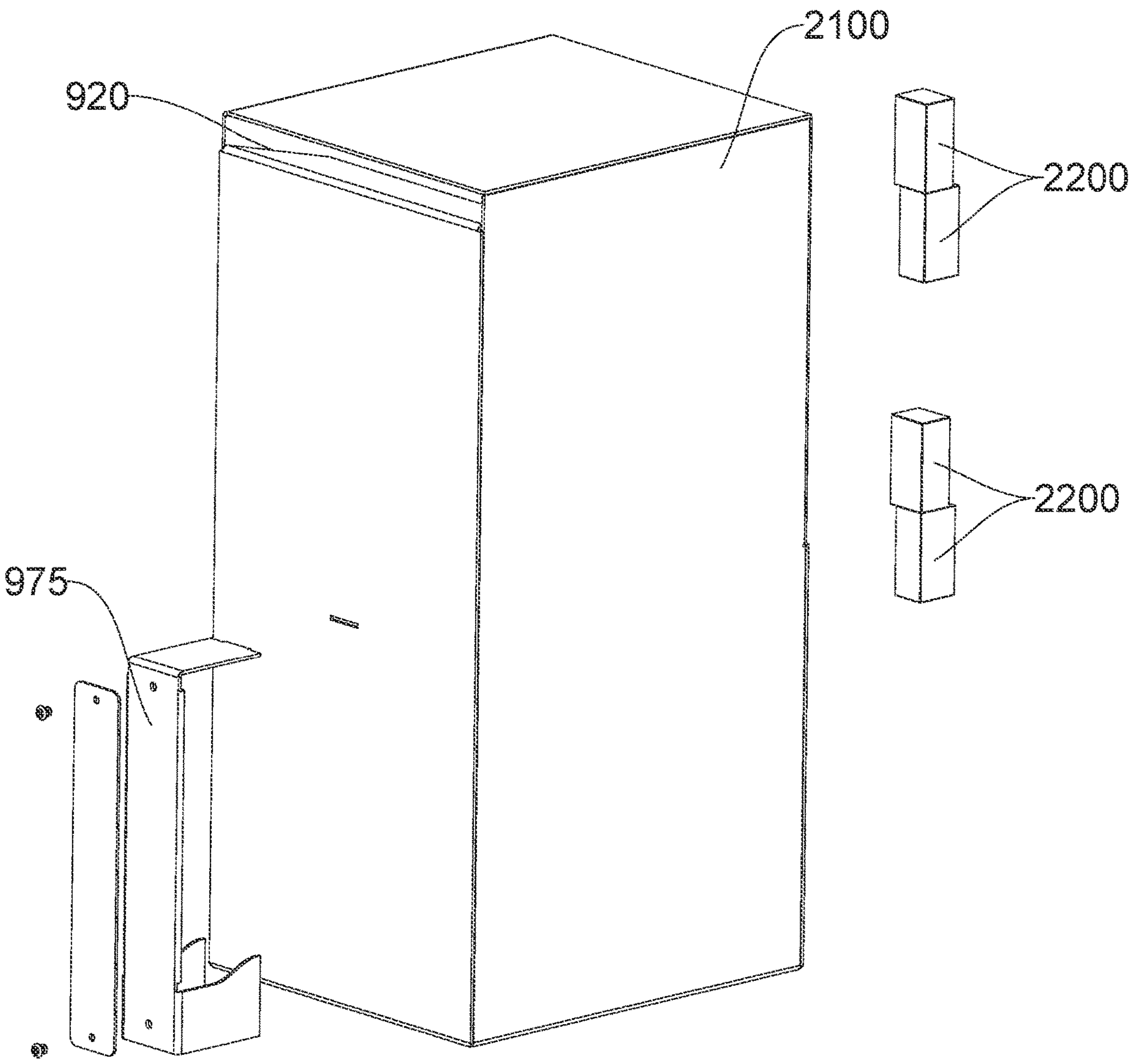
FIG. 22 shows an exploded view of the third alternative embodiment of the fluid containment system of FIGS. 20-21

Back wall 630 of upper portion 200 preferably comprises at least one side flange 600, as shown. Side flange 600 preferably wraps around each side wall 335, as shown. Side flange 600 preferably assembles together with side wall 335 using release fasteners 610, as shown. Back wall 630 preferably mounts close to cooking enclosure 150, as shown. Back wall 630 preferably allows passage of drain 130 into enclosure 640, as shown in FIG. 7.

Release fasteners 610 preferably comprise thumb actuatable fasteners, preferably thumb screws, as shown. Upon reading the teachings of this specification, those with ordinary skill in the art will now appreciate that, under appropriate circumstances, considering such issues as future technologies, costs, etc., other releasable fasteners, such as, for example, wing nuts, cam latches, bayonet slots, etc., may suffice.

Ventilation panel 220 preferably comprises vent 660, as shown. Vent 660 preferably comprises an adjustable vent, as shown. Vent 660 preferably comprises at least one butterfly opening, as shown. Upon reading the teachings of this specification, those with ordinary skill in the art will now appreciate that, under appropriate circumstances, considering such issues as future technology, cost, etc., other vent openings, such as, for example, slots, holes, perforations, etc., may suffice.

Vent 660 preferably comprises at least one closure 670 to close off vent 660, as shown. Closure 670 preferably comprises at least one damper. Closure 670 preferably comprises tab 665, as shown. Closure 670 preferably rotates about a pivot adjusting the butterfly opening between fully open and fully closed, permitting the selection of the amount of ventilation to allow enclosure 640, as shown. Upon reading the teachings of this specification, those with ordinary skill in the art will now appreciate that, under appropriate circumstances, considering such issues as future technologies, cost, etc., other closures, such as, for example, sliding closures, door closures, flap closures, etc., may suffice.

In use, vent 660 provides for fire safety. When outdoor cooking device 110 is at higher temperatures, the air coming from the drain 130 may reach ignition temperatures for the fluids contained in receptacle 370. To prevent a fire condition, vent 660 preferably may be closed to minimize available oxygen within enclosure 640.

FIG. 7 shows a perspective cutaway view, illustrating an interior of the enclosure of the fluid containment system, according to the preferred embodiment of FIG. 6. Although many of the elements of enclosure 640 are repeated from enclosure 140, as shown in FIG. 7, enclosure 640 utilizes collar mount 700 instead of mount flanges 400 to mount upper portion 200 to drain 130. Back wall 630 preferably separates from the remainder of upper portion 200 allowing mounting of back wall 630 to drain 130, as shown (at least embodying herein at least one mount structured and arranged to mount said enclosure on the outdoor cooking device). Separation of back wall 630 is preferably achieved via release of release fasteners 610 from release nuts 620, as shown. Back wall 630 preferably further comprises at least one collar mount 700, as shown. Collar mount 700 preferably attaches to back wall 630 with fasteners 250, as shown. Collar mount 700 preferably surrounds drain 130, as shown, as a collar. Collar mount 700 preferably comprises release fasteners 610, as shown. Release fasteners 610 preferably tighten onto drain 130, mounting back wall 630 onto drain 130, as shown. Upon reading the teachings of this specification, those with ordinary skill in the art will now appreciate that, under appropriate circumstances, considering such issues as future technologies, cost, etc., other mounting mechanisms, such as, for example, clamps, annular rings, pins, hooks, etc., may suffice.

Drain 130 preferably comprises a tube, preferably a square tube, as shown. Upon reading the teachings of this specification, those with ordinary skill in the art will now appreciate that, under appropriate circumstances, considering such issues as future technologies, costs, etc., other drain shapes, such as, for example, circular, V-shaped, rectangular, etc., may suffice. Back wall 630 preferably further comprises drainage channel 740, as shown. Drainage channel 740 preferably serves as an alternately preferably version of drainage channel 300, as shown. Drainage channel 740 preferably comprises a wedge shape, as shown.

Drainage channel 740 preferably mounts with bracket 720 onto back wall 630 using fasteners 250, as shown. Upon reading the teachings of this specification, those with ordinary skill in the art will now appreciate that, under appropriate circumstances, considering such issues as future technologies, costs, etc., other drainage channels, such as, for example, tubes, semicircular channels, V-shaped channels, etc., may suffice.

It is understood that while enclosure 640 is presented as an alternate embodiment from enclosure 140, the differing elements presented as parts of enclosure 640 and enclosure 140, respectively, are capable of interchangeability between enclosure 640 and enclosure 140 with like elements.

In a first alternative embodiment of a fluid containment system as shown in FIGS. 8-13B, the system 800 may comprise an enclosure 840 which may comprise an upper portion 900 and a lower portion 910. As described previously with regard to the preferred embodiment, one or more fasteners 250 such as by non-limiting example, a screw or a rivet may be used to securely hold the components of the upper portion 900 and lower portion 910 securely together. In some embodiments, the upper portion 900 is detachably coupled to the lower portion 910 such as by one or more rails 1010 on either the upper 900 or lower portion 910 configured to meet with one or more rails 1010 of the lower portion 910 such that the upper portion 900 and lower portion 910 are slidably coupled for ease and safe removal of the lower portion 910 form the upper portion 900 so that a fluid receptacle such as a bucket (not shown) may be removed from the lower portion 910 of the enclosure and emptied after receiving fluid from the drain 130 of an outdoor cooking device 110. Additionally, it is contemplated that the lower portion 910 may comprise a handle 975 for ease of use. In some implementations, one or more of the fasteners 250 may further comprise a locking mechanism configured to allow the lower portion 910 of the enclosure to remain in a locked position when in use such that a user cannot freely slide the lower portion 910 along the rails 1010 when the outdoor cooking device 110 is in use. In some implementations, the locking device may be integral to rather than coupled with the handle 975. In some implementations, the lower portion 910 of the enclosure 840 may comprise a pouring spout (not shown) for ease of emptying cooking discharge from the receptacle within the lower portion 910.

As shown in FIGS. 9B-10, FIG. 12B, and FIG. 13B, in some embodiments, the enclosure 840 may comprise an internal mount 985 at least partially within the upper portion 900 of the enclosure 840. The internal mount may be configured to receive a drain 130 of an outdoor cooking device 110, however, it is also contemplated that the outdoor cooking device 110 may be configured with an abbreviated drain structure such that the fluid channel mount walls 1020 of the internal mount 985 form a fluid channel for fluid to pass directly from the outdoor cooking device 110 and into a receptacle such a bucket within the lower portion 910 of the enclosure. It is contemplated that the receptacle may have any appropriate shape such as round, oval, square, rectangular, etc.

The internal mount 985 may comprise a mounting plate base 1030 through which one or more mounting fasteners 995 may pass to secure the internal mount 985 to the outdoor cooking device 110. In some implementations, the mounting plate base 1030 may be integral to or comprise a side panel 1000 of the upper portion 900 of the enclosure 840, however, it is also contemplated that the mounting plate base 1030 is positioned within the upper portion 900 of the enclosure. The internal mount 985 may further comprise one or more fluid channel mount walls 1020 that when mounted in place with one or more mounting fasteners 995 may be configured to allow fluid to pass from the drain 130 of the outdoor cooking device 110 into the enclosure and thus, into a receptacle (not shown) within the lower portion 910 of the enclosure 840. In some embodiments, the interior of the upper portion 110 of the enclosure may further comprise an auxiliary fluid guide plate 1200 configured to contain collected fluid and funnel the fluid downward into the receptacle of the lower portion of the enclosure 840. The auxiliary fluid guide plate 1200 may also prevent one or more internal parts of the enclosure 840 such as by non-limiting example, the sliding rails 1010 from gathering a buildup of grease or other cooking byproducts. Additionally, the auxiliary fluid guide plate 1200 may also serve to prevent the lower portion 910 of the enclosure 840 from falling when partially pulled to an open position along the one or more rails 1010.

The upper portion 900 of the receptacle may comprise one or more side walls 1000 which may optionally be configured with one or more thermal vents 920 to allow for heat to escape with the outdoor cooking device 110 is in use. While the thermal vent 920 may be of any appropriate size, in some implementations, the thermal vent 920 may be sized to be substantially a same size as the drain 130 of the outdoor cooking device 110 to restrict airflow.

In a second alternative embodiment of a fluid containment system 1400 as shown in FIGS. 14-19B, it is contemplated that at least a portion of the enclosure 840, shown here as the upper portion 900 of the enclosure is permanently affixed to the outdoor cooking device 110 such as by non-limiting example, by welding the upper portion 900 of the enclosure to the outdoor cooking device 110. In this embodiment, it is contemplated that the drain 130 of the outdoor cooking device may extend through an opening in the upper portion 900 of the enclosure 840 or that one or more auxiliary fluid guide plates 1200 may be positioned within the enclosure 840 to guide fluid into a receptacle within the lower portion 910 of the enclosure 840. The auxiliary fluid guide plate 1200 may also prevent one or more internal parts of the enclosure 840 such as by non-limiting example, the sliding rails 1010 from gathering a buildup of grease or other cooking byproducts. Additionally, the auxiliary fluid guide plate 1200 may also serve to prevent the lower portion 910 of the enclosure 840 from falling when partially pulled to an open position along the one or more rails 1010.

Figure 23:
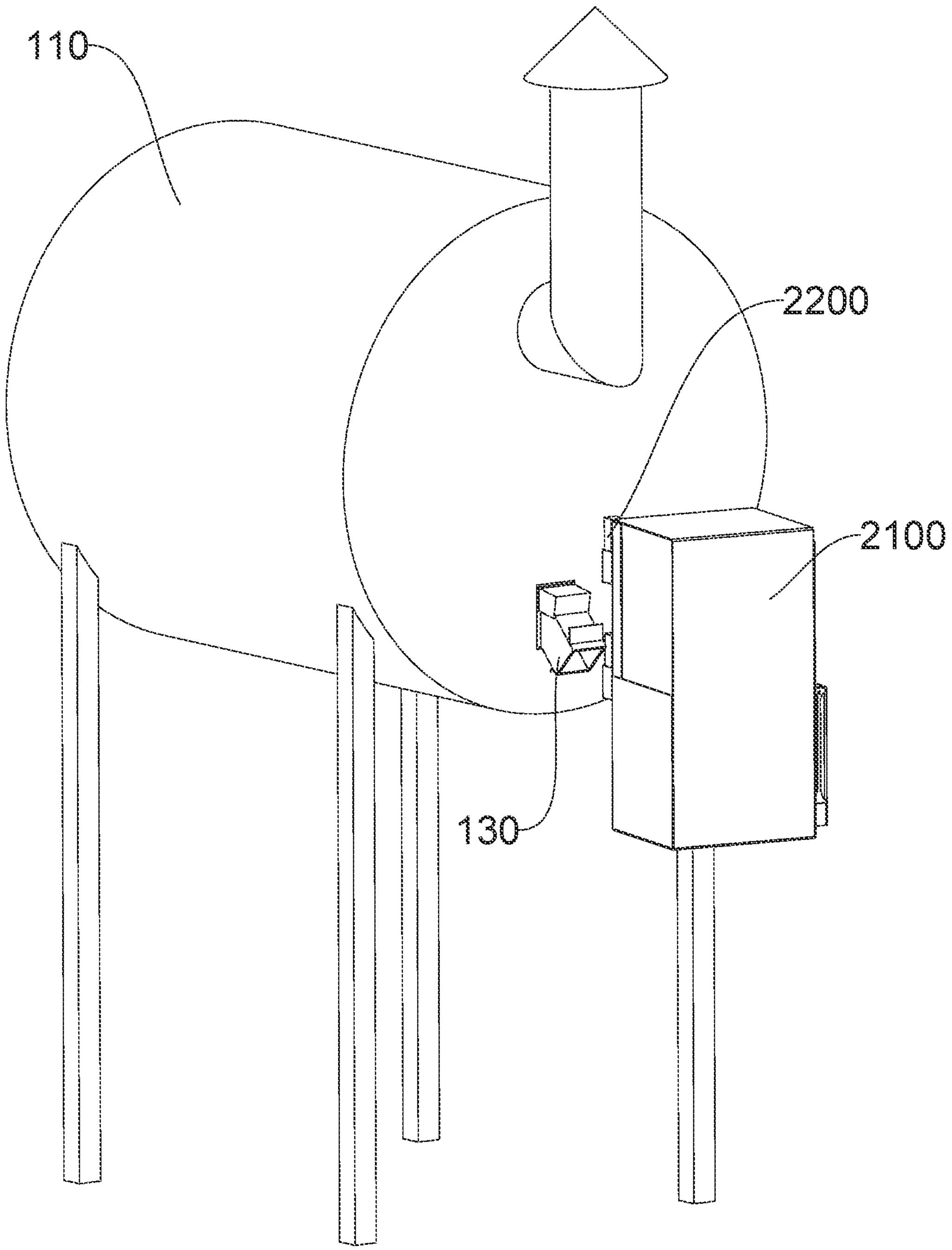
FIG. 23 shows a perspective view of the third alternative embodiment of a fluid containment system in an open position while hingedly coupled to an outdoor cooking device.
Figure 24B:
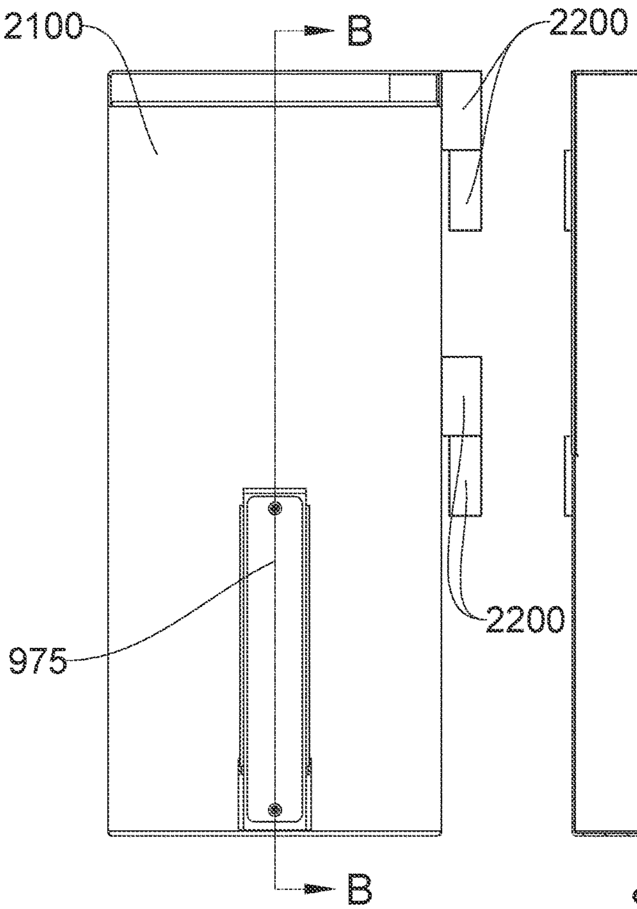
FIG. 24B shows the sectional view B-B of FIG. 24A.
Figure 24A:
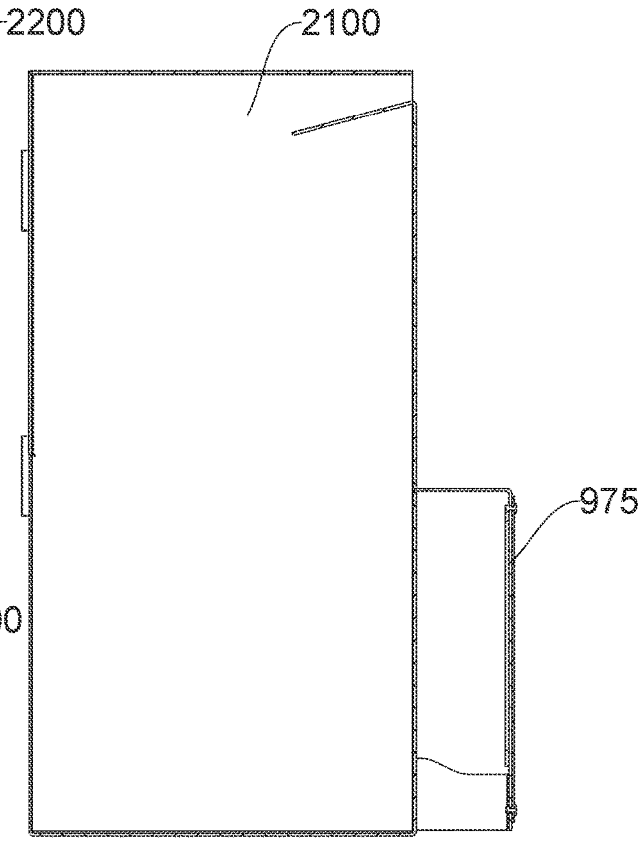
FIG. 24A shows a perspective view of the third alternative embodiment of the fluid containment system of FIGS. 20-23.
Figure 25:
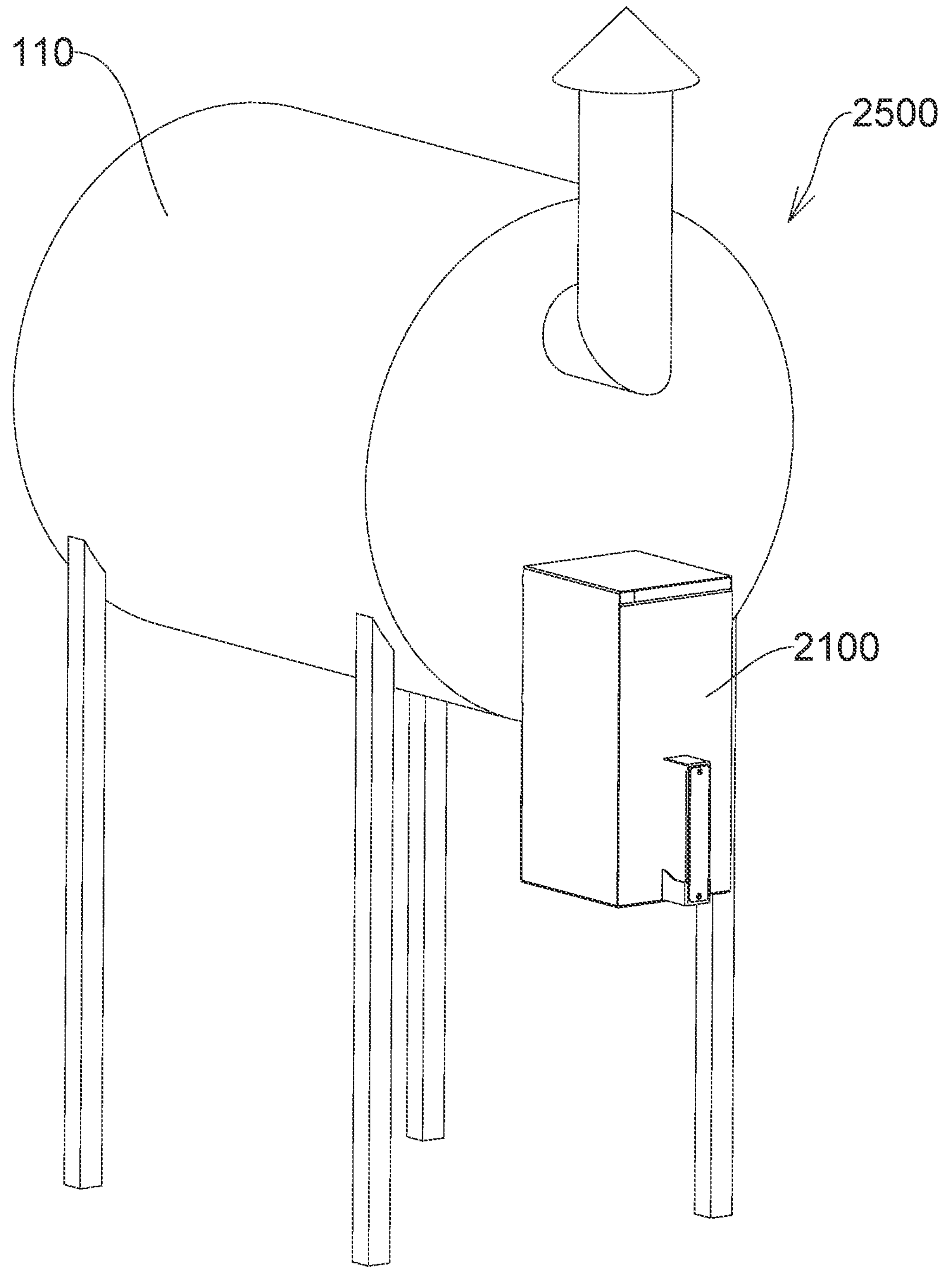
FIGS. 25-26 and 28 show perspective views of a fourth alternative embodiment of a fluid containment system comprising at least one notched mounting bracket.
Figure 26:
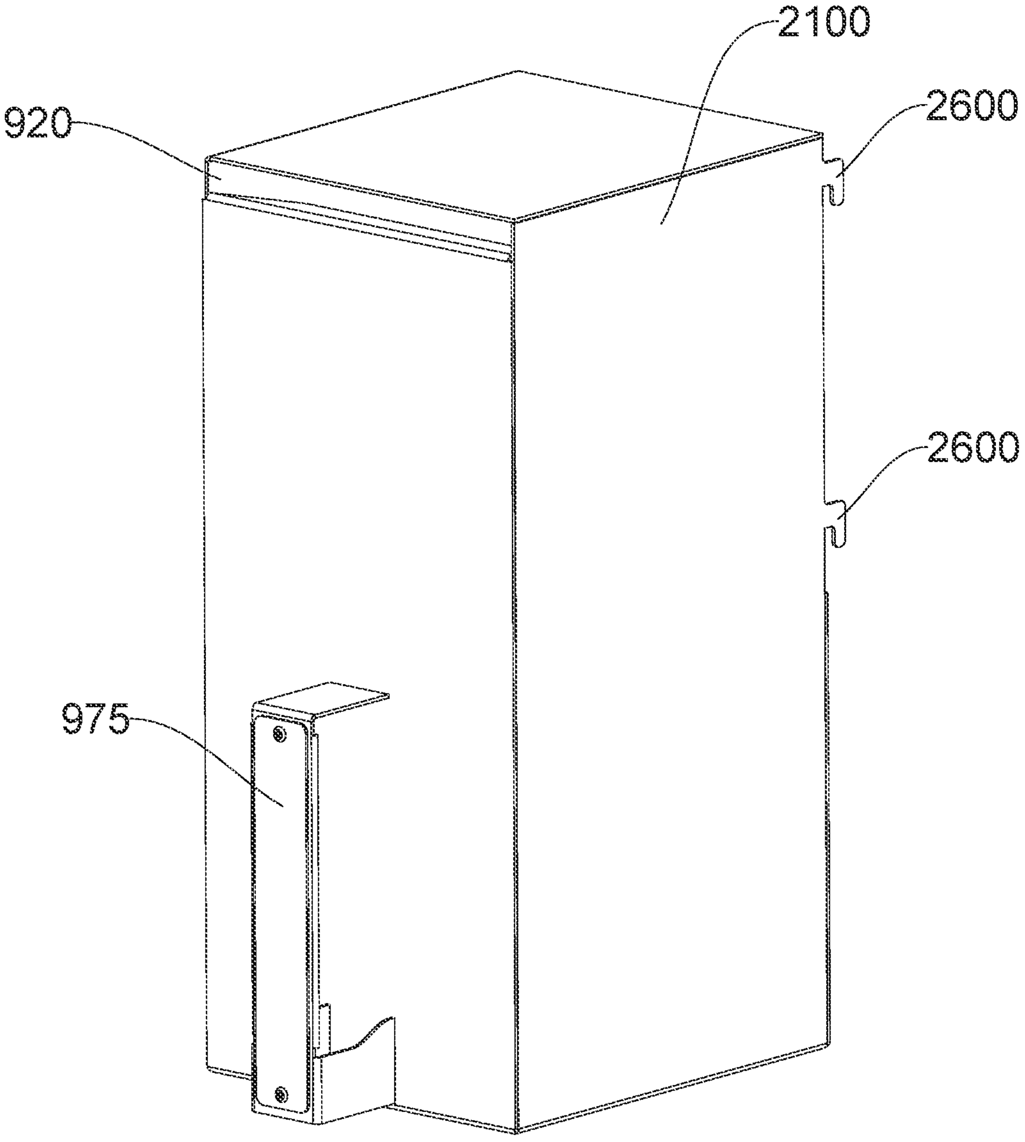
Figure 27:
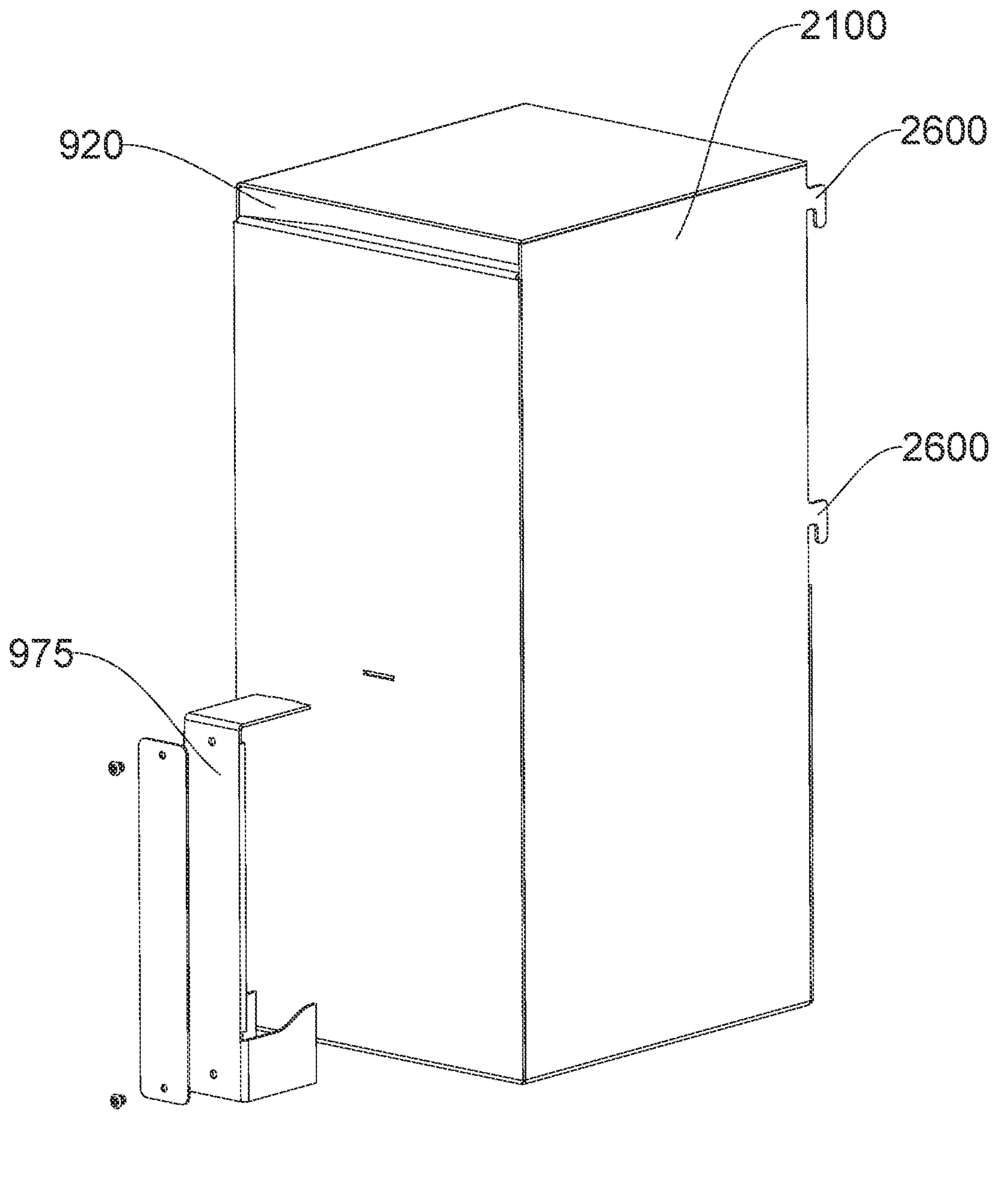
FIG. 27 shows an exploded view of the fourth alternative embodiment of the fluid containment system shown in FIGS. 25-26 and 28.

In a third alternative embodiment of a fluid containment system 2000 as shown in FIGS. 20-24B, the enclosure 2100 may be hingedly coupled to the outdoor cooking device 110 via one or more hinges 2200. When in the open position as shown in FIG. 23, the enclosure 2100 may hingedly swing outward from the outdoor cooking device 110 for ease of emptying the fluid receptacle positioned within the enclosure 2100. In various implementations, the upper portion 900 of the enclosure 2100 may be hingedly coupled to the outdoor cooking device; however, in other implementations, the lower portion 910 may also hingedly couple to the outdoor cooking device 110.

Figure 28:
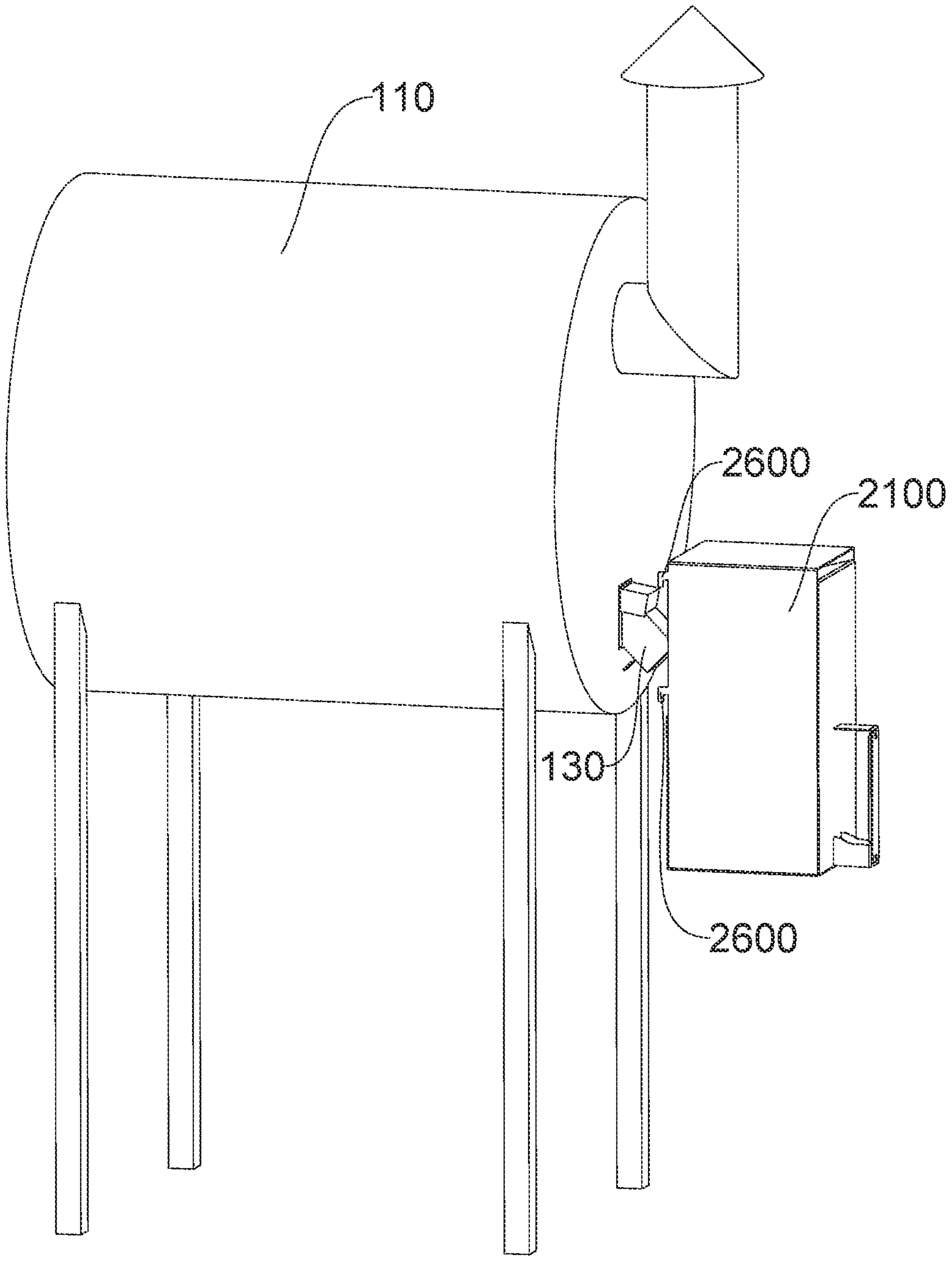
Figure 29A:
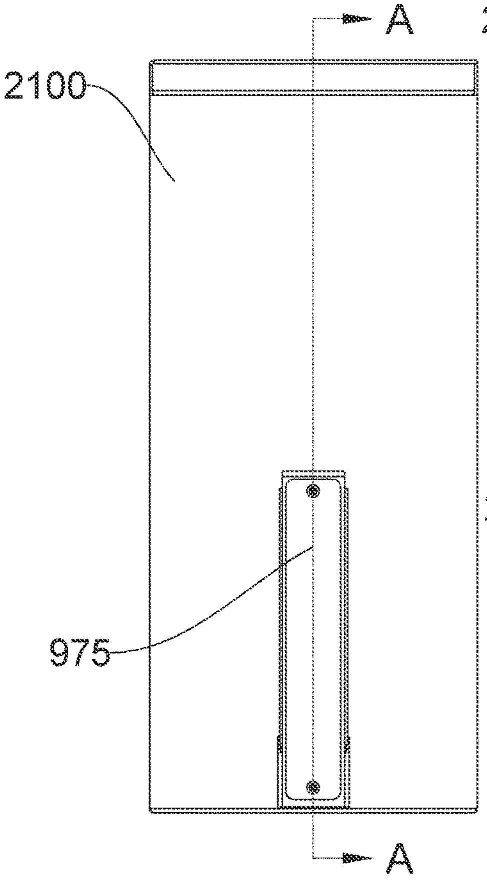
FIG. 29A shows a perspective view of the fourth alternative embodiment of the fluid containment system of FIGS. 25-28.
Figure 29B:
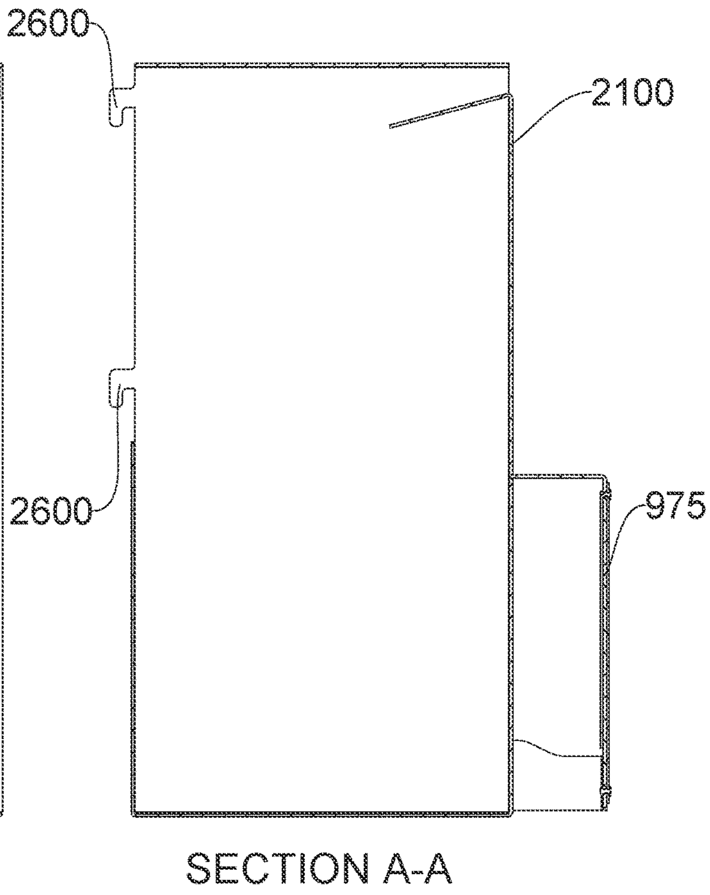
FIG. 29B shows the sectional view A-A of FIG. 29A.

In a fourth alternative embodiment of a fluid containment system 2500, as shown in FIGS. 25-29B, the enclosure may comprise one or more notched mounting brackets 2600 configured to detachably couple the enclosure 2100 to the outdoor cooking device 110. As shown in FIG. 28, the one or more mounting brackets 2600 may be configured to mate with and/or couple with one or more corresponding elements of the outdoor cooking device 110.

While any of the preferred or alternative embodiments described herein may comprise an upper portion 900 and a lower portion 910 of the enclosure that may be slidably coupled by one or more rails corresponding to a mating structure on the opposite portion of the enclosure. Alternatively, one or more of the upper portion 900 and the lower portion 910 may be threaded so as to detachably couple the upper portion 900 and the lower portion 910 together. It is also contemplated that any of the embodiments described herein may also be used with and coupled to an outdoor cooking device 110 having a fluid drain 130 positioned on a bottom of the outdoor cooking device 110 rather than the side of the device 110.

Although applicant has described applicant's preferred and alternative embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

In places where the description above refers to particular implementations of systems and methods for fluid containment systems it should be readily apparent that a number of modifications may be made without departing from the spirit thereof and that these implementations may be applied to other to systems and methods for fluid containment for an outdoor cooking device.

What is claimed is:

1. A system, relating to catching fluid drainage from an outdoor cooking device in an outdoor environment, comprising:

at least one receptacle structured and arranged to receive and collect fluid draining from the outdoor cooking device generated by food cooking within a cooking enclosure of the outdoor cooking device; and an enclosure structured and arranged to enclose the at least one receptacle;

wherein the enclosure comprises:

an upper portion comprising a top and side walls;

a lower portion comprising a bottom and side walls surrounding the at least one receptacle, the lower portion being separable from the upper portion;

at least one mount configured to mount the enclosure to the outdoor cooking device.

2. The system of claim 1, further comprising the outdoor cooking device.

3. The system of claim 2, wherein the outdoor cooking device comprises a wood pellet grill.

4. The system of claim 2, wherein the mount is welded to the outdoor cooking device.

5. The system of claim 2, wherein the upper portion of the enclosure is permanently affixed to the outdoor cooking device.

6. The system of claim 1, wherein the lower portion and the upper portion comprise interlocking rails structured and arranged to enable said lower portion to slide with respect to said upper portion.

7. The system of claim 2, further comprising at least one hinge coupled to at least one of the upper portion and the lower portion of the enclosure and the outdoor cooking device.

8. The system of claim 1, wherein the mount comprises at least one fluid channel structured and arranged to redirect the fluid drainage from a fluid drainage outlet of the outdoor cooking equipment to the at least one receptacle.

9. The system of claim 1 wherein the lower portion comprises at least one handle.

10. The system of claim 1, wherein the lower portion comprises a watertight portion structured and arranged to collect fluid spills from said at least one receptacle.

11. The system of claim 1, wherein the at least one mount comprises at least one notched mounting bracket.

12. A system, relating to catching fluid drainage from an outdoor cooking device in an outdoor environment, comprising:

the outdoor cooking device;

a receptacle structured and arranged to receive and collect fluid draining from the outdoor cooking device generated by food cooking within a cooking enclosure of the outdoor cooking device; and an enclosure configured to enclose the at least one receptacle, the enclosure comprising at least one mount internal to the enclosure, the mount further comprising a fluid channel configured to redirect fluid drainage from a fluid drainage outlet of the outdoor cooking device to the receptacle.

13. The system of claim 12, wherein the enclosure is permanently affixed to the outdoor cooking device.

14. The system of claim 12, further comprising at least one hinge coupled to the enclosure and the outdoor cooking device.

15. The system of claim 12, wherein the enclosure comprises at least one handle on an exterior surface of the enclosure.

16. The system of claim 12, wherein the enclosure comprises an upper portion and a lower portion that are removably coupled.

17. A system, relating to catching fluid drainage from an outdoor cooking device in an outdoor environment, comprising:

a receptacle structured and arranged to receive and collect fluid draining from the outdoor cooking device generated by food cooking within a cooking enclosure of the outdoor cooking device; and an enclosure structured and arranged to enclose said at least one receptacle, the enclosure comprising at least two external protrusions configured to affix the enclosure to the outdoor cooking device such that a fluid drainage outlet of the outdoor cooking device extends through not the enclosure and directs fluid from the outdoor cooking device into the receptacle.

18. The system of claim 17, further comprising the outdoor cooking device.

19. The system of claim 18, wherein the outdoor cooking device is a wood pellet grill.

20. The system of claim 17, wherein the enclosure further comprises at least one thermal vent.

* * * * *